US012651705B2

(12) United States Patent
Masunari et al.

(10) Patent No.: US 12,651,705 B2
(45) Date of Patent: Jun. 9, 2026

(54) CAPACITOR

(71) Applicant: Murata Manufacturing Co., Ltd., Nagaokakyo (JP)

(72) Inventors: Akio Masunari, Nagaokakyo (JP); Sachiko Hayashi, Nagaokakyo (JP); Naoki Iwaji, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 473 days.

(21) Appl. No.: 17/814,612

(22) Filed: Jul. 25, 2022

(65) Prior Publication Data

US 2022/0359121 A1 Nov. 10, 2022
US 2023/0215645 A9 Jul. 6, 2023

Related U.S. Application Data

(63) Continuation of application No. PCT/JP2021/011955, filed on Mar. 23, 2021.

(30) Foreign Application Priority Data

Mar. 24, 2020 (JP) ................................. 2020-052217

(51) Int. Cl.
*H01G 4/236* (2006.01)
*H01G 4/08* (2006.01)
*H01G 4/232* (2006.01)

(52) U.S. Cl.
CPC ............. *H01G 4/236* (2013.01); *H01G 4/232* (2013.01); *H01G 4/08* (2013.01)

(58) Field of Classification Search
CPC .......... H01G 9/15; H01G 4/236; H01G 4/232; H01G 4/08

(Continued)

(56) References Cited

U.S. PATENT DOCUMENTS 6,917,514 B2 * 7/2005 Mido ....................... H01G 9/04
29/25.03
7,898,795 B2 * 3/2011 Kasuga .................... H01G 9/14
361/519

(Continued)

FOREIGN PATENT DOCUMENTS

JP 2002289469 A 10/2002
JP 2002289471 A * 10/2002 ............. H01G 9/032

(Continued)

OTHER PUBLICATIONS

International Search Report in PCT/JP2021/011955, mailed Jun. 22, 2021, 3 pages.

*Primary Examiner* — Arun Ramaswamy
(74) *Attorney, Agent, or Firm* — ArentFox Schiff LLP

(57) ABSTRACT

A capacitor that includes an insulating substrate; a capacitance forming portion including a metal porous body, a dielectric film, and a conductive film; and a sealing portion that seals the capacitance forming portion. The capacitance forming portion is on a first main surface of the insulating substrate. A first external connection line including a first via conductor penetrating the insulating substrate from the first main surface side toward the second main surface side is connected to the metal porous body; and a second external connection line including a second via conductor penetrating the insulating substrate from the first main surface side toward the second main surface side is connected to the conductive film. When viewed in a normal direction of the first main surface, the first via conductor and the second via conductor are both in a region where the capacitance forming portion is disposed.

6 Claims, 20 Drawing Sheets

(58) Field of Classification Search
   USPC .......................... 361/523, 306.1, 306.3, 303
   See application file for complete search history.

(56)                    References Cited

U.S. PATENT DOCUMENTS

|  |  |  |  |  |
|---|---|---|---|---|
| 7,940,516 | B2 * | 5/2011 | Shioga | H01G 4/236 |
|  |  |  |  | 29/25.03 |
| 2009/0199378 | A1 * | 8/2009 | Chacko | H01G 9/15 |
|  |  |  |  | 29/25.03 |
| 2010/0283122 | A1 | 11/2010 | Pulugurtha et al. |  |
| 2013/0182374 | A1 * | 7/2013 | Mizukoshi | H01G 9/15 |
|  |  |  |  | 29/25.03 |
| 2016/0286654 | A1 | 9/2016 | Romig et al. |  |
| 2018/0151297 | A1 * | 5/2018 | Hattori | H01G 4/005 |
| 2018/0277306 | A1 | 9/2018 | Lee et al. |  |
| 2019/0027314 | A1 * | 1/2019 | Kashihara | H01G 9/07 |
| 2019/0267188 | A1 | 8/2019 | Fujii et al. |  |
| 2019/0355516 | A1 | 11/2019 | Ishihara et al. |  |
| 2019/0362904 | A1 * | 11/2019 | Furukawa | H01G 9/04 |

FOREIGN PATENT DOCUMENTS

|  |  |  |  |  |
|---|---|---|---|---|
| JP | 2009224555 | A |  | 10/2009 |
| JP | 2010062406 | A | * | 3/2010 |
| JP | 2010239054 | A |  | 10/2010 |
| JP | 2018515909 | A |  | 6/2018 |
| WO | 2008126181 | A1 |  | 10/2008 |
| WO | 2018092722 | A1 |  | 5/2018 |
| WO | 2018151028 | A1 |  | 8/2018 |

* cited by examiner

1A

1B1

(10)
10b 14
13

1B2

(10)
10b 14
13

1B3

(10)
10b 14
13

1B4

(10)
10b 14
13

1C

(10)
10b 13
14

CAPACITOR

CROSS REFERENCE TO RELATED APPLICATIONS

The present application is a continuation of International application No. PCT/JP2021/011955, filed Mar. 23, 2021, which claims priority to Japanese Patent Application No. 2020-052217, filed Mar. 24, 2020, the entire contents of each of which are incorporated herein by reference.

FIELD OF THE INVENTION

The present invention relates to a capacitor including a capacitance forming portion including a metal porous body, a dielectric film, and a conductive film.

BACKGROUND OF THE INVENTION

For example, US 2018/0277306 A (Patent Document 1) discloses a capacitor in which the capacitance forming portion is provided with the metal porous body, the dielectric film covering a surface of the metal porous body, and the conductive film covering the dielectric film. In the capacitor, the metal porous body is made of a sintered body of metal grain, and both a dielectric layer and the conductive film are formed by an atomic layer deposition (ALD) method.

Here, the capacitance forming portion having the above configuration needs to be airtightly sealed by a sealing portion from the viewpoint of moisture resistance. Therefore, when specifically designing the capacitor including the capacitance forming portion having the above configuration, it is important how to extend an external connection line from the capacitance forming portion sealed by the sealing portion.

In this regard, the capacitor disclosed in Patent Document 1 employs a configuration in which a pair of wiring layers is provided on one main surface of an insulating substrate provided with the capacitance forming portion, and a metal porous body of the capacitance forming portion and the conductive film are bonded to the pair of wiring layers. Then, the pair of wiring layers is extended in directions different from each other in an in-plane direction of the main surface of the insulating substrate.

Patent Document 1: US 2018/0277306 A

SUMMARY OF THE INVENTION

However, in the case of the capacitor disclosed in Patent Document 1, since the pair of wiring layers described above is extended in directions different from each other, a problem that so-called equivalent series inductance (ESL) increases occurs. In addition, since the wiring layer is extended outward in the in-plane direction of the main surface of the insulating substrate, not only the capacitor naturally increases in size, but also an occupied volume of a portion other than the capacitance forming portion in the capacitor increases, and as a result, a problem that an increase in capacitance is inhibited occurs.

Therefore, the present invention has been made to solve the above-described problems, and an object of the present invention is to achieve low ESL and high capacitance in a capacitor including a capacitance forming portion including a metal porous body, a dielectric film, and a conductive film.

A capacitor according to the present invention includes an insulating substrate having a first main surface and a second main surface opposed to the first main surface; a capacitance forming portion on the first main surface, the capacitance forming portion including a conductive metal porous body, a dielectric film covering a surface of the metal porous body, and a conductive film covering the dielectric film; a sealing portion on the first main surface and positioned so as to seal the capacitance forming portion together with the insulating substrate; a first external connection line connected to the conductive metal porous body of the capacitance forming portion, the first external connection line including a first via conductor penetrating the insulating substrate so as to reach the second main surface from the first main surface; and a second external connection line connected to the conductive film of the capacitance forming portion, the second external connection line including a second via conductor penetrating the insulating substrate so as to reach the second main surface from the first main surface, wherein the first via conductor and the second via conductor are both located in a region where the capacitance forming portion is disposed when viewed in a normal direction of the first main surface.

In the capacitor according to the present invention, a plurality of the first via conductors and a plurality of the second via conductors may be provided.

In the capacitor according to the present invention, the plurality of first via conductors and the plurality of second via conductors may be arranged in an array when viewed in the normal direction of the first main surface, and in this case, it is preferred that a polarity of adjacent via conductors at the shortest distance from each other among the plurality of the first via conductors and the plurality of the second via conductors are different from each other.

In the capacitor according to the present invention, the first external connection line may further include a connection conductor on the first main surface so as to cover at least a part of the first via conductor, and in this case, it is preferred that the metal porous body is bonded to the connection conductor, and the conductive film is bonded to the second via conductor.

In the capacitor according to the present invention, the connection conductor may be located only on the first via conductor.

In the capacitor according to the present invention, the connection conductor may be located on a portion of the first main surface excluding the second via conductor.

In the capacitor according to the present invention, between the first via conductor and the second via conductor that are adjacent to each other at the shortest distance, the connection conductor may extend to the second via conductor side from an intermediate position of a line connecting adjacent ends of the first via conductor and the second via conductor.

In the capacitor according to the present invention, the first external connection line may further include an auxiliary connection conductor on the first main surface that does not cover the first via conductor and the second via conductor, and in this case, the metal porous body is preferably bonded to the auxiliary connection conductor.

In the capacitor according to the present invention, at a boundary portion between the second via conductor and a substrate of the insulating substrate, the substrate may be covered with the dielectric film, the dielectric film may be covered with the conductive film, and the conductive film may be covered with the second via conductor.

In the capacitor according to the present invention, the conductive film is preferably a deposited film having a columnar structure including a fine columnar body grown in a direction substantially perpendicular to a surface of the dielectric film.

In the capacitor according to the present invention, a close contact layer for improving close contact between the conductive film and the second via conductor may be further provided between the conductive film and the second via conductor.

In the capacitor according to the present invention, a surface roughness of the insulating substrate in a portion covered with the second via conductor is preferably 200 nm to 20 μm.

In the capacitor according to the present invention, the insulating substrate may contain at least one of $Al_2O_3$, MgO, $Mg_2SiO_4$, $BaTiO_3$, $SrTiO_3$, and $CaTiO_3$ as a main material; the dielectric film may be made of a film containing at least one of $AlO_x$, $SiO_x$, $HfO_x$, and $ZrO_x$; the conductive film may be made of a film containing at least one of TiN, WN, $RuO_2$, ZnO, $(Zn_xAl_{1-x})$ O, and NiO; and the second via conductor may contain at least one of Cu, Ni, Ag, Sn, and Au.

In the capacitor according to the present invention, the second via conductor may have a tapered sectional shape decreasing from the first main surface side toward the second main surface side.

In the capacitor according to the present invention, the metal porous body may be made of a sintered body of metal grains.

In the capacitor according to the present invention, a crystallite diameter of the metal porous body is preferably 20 nm to 500 nm.

In the capacitor according to the present invention, a part of the metal porous body may enter the second via conductor in a portion penetrating the insulating substrate.

In the capacitor according to the present invention, the metal porous body does not have to enter the second via conductor in a portion penetrating the insulating substrate.

In the capacitor according to the present invention, the sealing portion may be made of an insulating resin material or an insulating inorganic material.

In the capacitor according to the present invention, the sealing portion may include an upper sealing portion opposing the insulating substrate when viewed from the capacitance forming portion, and a side sealing portion surrounding the capacitance forming portion between the insulating substrate and the upper sealing portion, and in this case, the upper sealing portion may be made of an insulating resin material, and the side sealing portion may be made of a glass material.

In the capacitor according to the present invention, a total number of via conductors including the first via conductor and the second via conductor may be four or more, and a diameter of the first via conductor and a diameter of the second via conductor may be both 0.05 mm to 0.25 mm.

In the capacitor according to the present invention, the first external connection line may further include a first bump portion covering the first via conductor at a position on the second main surface side, and the second external connection line may further include a second bump portion covering the second via conductor at a position on the second main surface side.

According to the present invention, low ESL and high capacitance are achieved in the capacitor including the capacitance forming portion including the metal porous body, the dielectric film, and the conductive film.

DETAILED DESCRIPTION OF THE INVENTION

Figure 1:
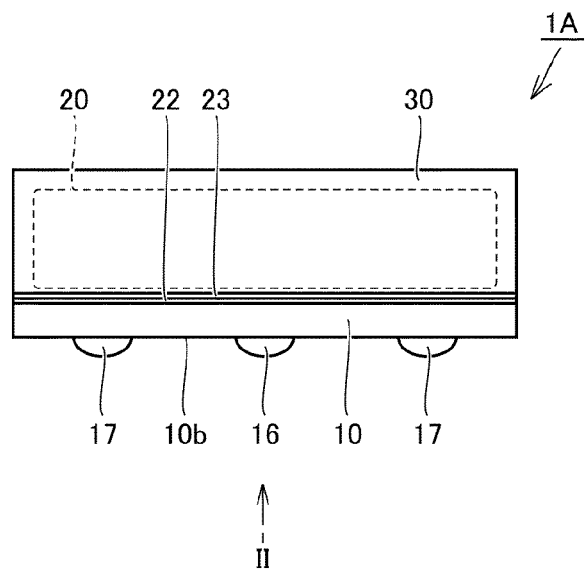
FIG. 1 is a schematic front view of a capacitor according to a first embodiment.

Hereinafter, embodiments of the present invention will be described in detail with reference to the drawings. Note that in the following embodiments, the same or common parts are denoted by the same reference numerals in the drawings, and description thereof will not be repeated.

First Embodiment

Figure 2:
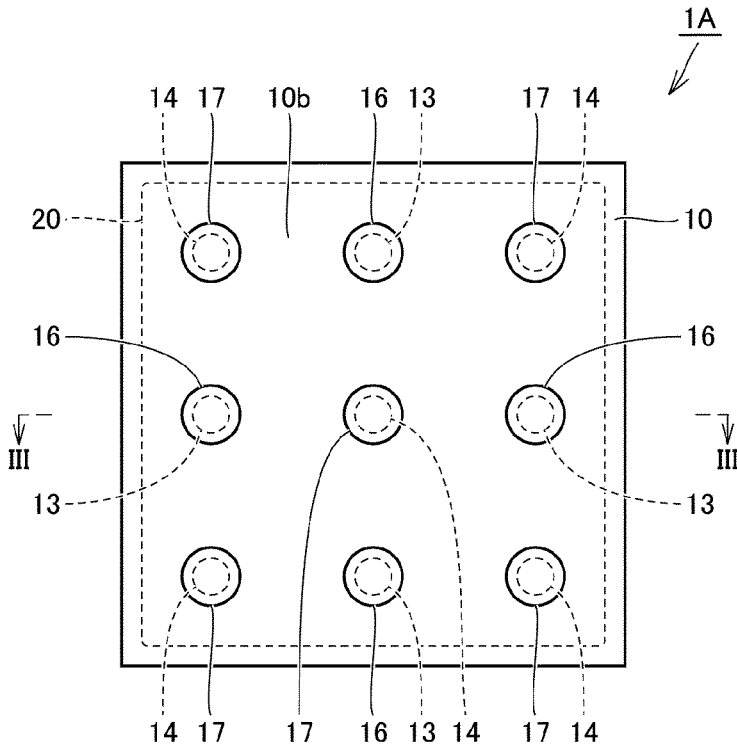
FIG. 2 is a schematic bottom view of the capacitor illustrated in FIG. 1.
Figure 3:
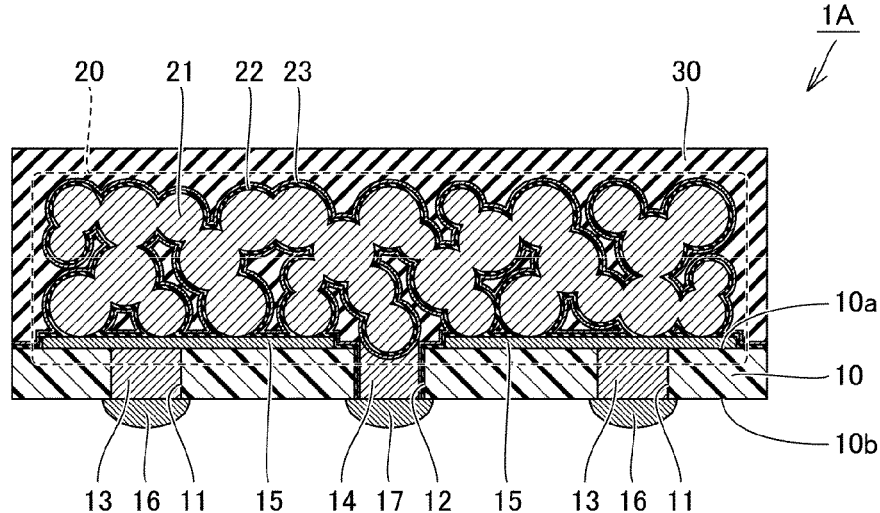
FIG. 3 is a schematic sectional view of the capacitor illustrated in FIG. 1.
Figure 4:
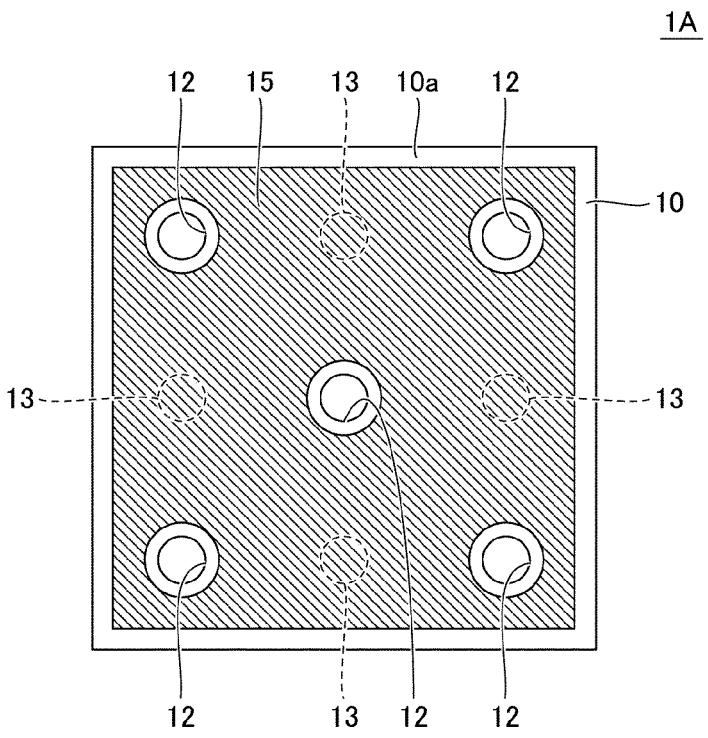
FIG. 4 is a schematic plan view of an insulating substrate as one component before assembling the capacitor illustrated in FIG. 1.
Figure 5:
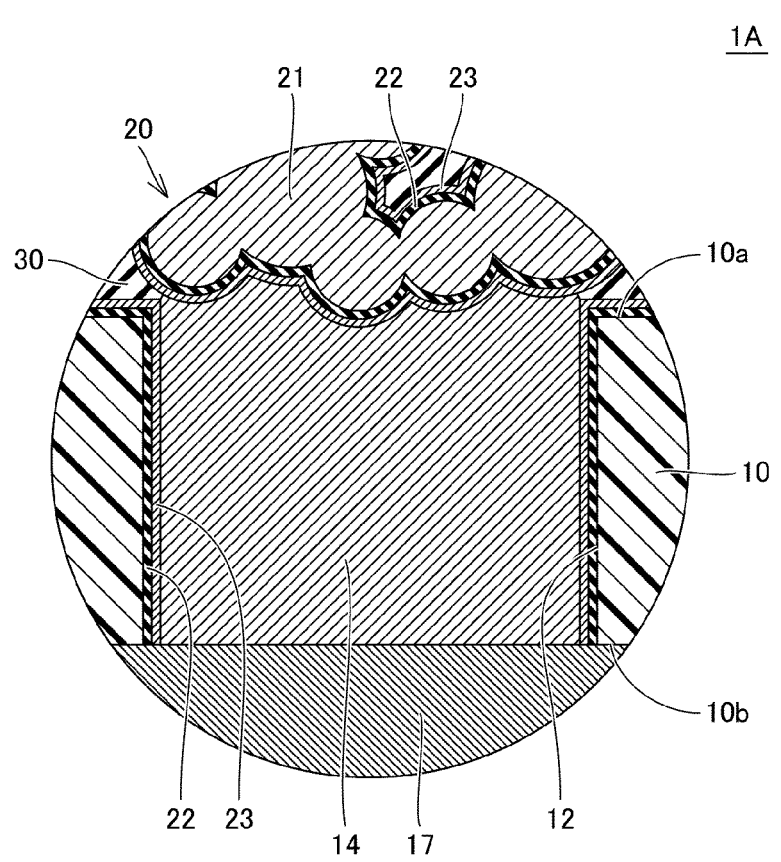
FIG. 5 is an enlarged schematic sectional view of the vicinity of a second via conductor illustrated in FIG. 3.

FIG. 1 is a schematic front view of a capacitor according to a first embodiment. FIG. 2 is a schematic bottom view of the capacitor as viewed from a direction of an arrow II illustrated in FIG. 1. FIG. 3 is a schematic sectional view of the capacitor taken along line III-III illustrated in FIG. 2. FIG. 4 is a schematic plan view of an insulating substrate as one component before assembling the capacitor illustrated in FIG. 1. Further, FIG. 5 is an enlarged schematic sectional view of the vicinity of a second via conductor illustrated in FIG. 3. First, a configuration of a capacitor 1A according to the present embodiment will be described with reference to FIGS. 1 to 5.

As illustrated in FIGS. 1 to 3, the capacitor 1A has a flat and substantially rectangular parallelepiped outer shape, and is a so-called surface mount electronic component having a bottom surface formed as a mounting surface on a wiring substrate or the like. The capacitor 1A mainly includes an insulating substrate 10, a capacitance forming portion 20, and a sealing portion 30. Among them, the capacitance forming portion 20 is provided on the insulating substrate 10. The capacitance forming portion 20 is positioned inside the capacitor 1A by being sealed by the insulating substrate 10 and the sealing portion 30 provided on the insulating substrate 10.

In addition, the insulating substrate 10 is provided with a first via conductor 13, a second via conductor 14, a connection conductor 15, a first bump 16, and a second bump 17. The first via conductor 13, the second via conductor 14, the connection conductor 15, the first bump 16, and the second bump 17 constitute a pair of external connection lines as extended lines for electrically connecting the capacitance forming portion 20 located inside the capacitor 1A to an external circuit. The pair of external connection lines includes a first external connection line as a positive electrode and a second external connection line as a negative electrode.

As illustrated in FIGS. 1 to 4, the insulating substrate 10 is made of a flat plate-like member having a first main surface 10a and a second main surface 10b opposed to the first main surface 10a. As the insulating substrate 10, a substrate having electrical insulation properties is preferably used, and a substrate made of an inorganic material as a main component can be preferably used. More specifically, as the insulating substrate 10, for example, a substrate containing as a main material any one of Si, $Al_2O_3$, $ZrO_2$, BN, $Si_3N_4$, AlN, MgO, $Mg_2SiO_4$, $BaTiO_3$, $SrTiO_3$, and $CaTiO_3$ can be used.

Among them, it is particularly preferable to use a substrate containing as a main material any one of $Al_2O_3$, MgO, $Mg_2SiO_4$, $BaTiO_3$, $SrTiO_3$, and $CaTiO_3$ formed to have a thermal expansion coefficient close to a thermal expansion coefficient at normal temperature of a metal porous body 21, which will be described later, included in the capacitance forming portion 20. As described above, by bringing the thermal expansion coefficient close to the thermal expansion coefficient of the metal porous body 21 at normal temperature, close contact strength between the insulating substrate 10 and the connection conductor 15 and close contact strength between the connection conductor 15 and the metal porous body 21 can be maintained high also after a firing step for forming the metal porous body 21.

Here, when Ni or a Ni alloy is selected as the metal porous body 21 from various materials to be described later, it is preferable to use, as the insulating substrate 10, a substrate containing as a main material a binary or higher inorganic oxide such as $Al_2O_3$ or MgO having a thermal expansion coefficient close to a range of 0.5 times to 1.5 times the thermal expansion coefficient of Ni at normal temperature, or a substrate containing as a main material a ternary or higher inorganic oxide such as $Mg_2SiO_4$, $BaTiO_3$, $SrTiO_3$, or $CaTiO_3$ having a thermal expansion coefficient close to a range of 0.7 times to 1.3 times the thermal expansion coefficient of Ni at normal temperature.

A thickness and a size of the insulating substrate 10 are not particularly limited, but in the present embodiment, an alumina substrate having a thickness of 0.075 mm and a side length of 0.68 mm and having a square shape in plan view is used as the insulating substrate 10.

The insulating substrate 10 is provided with a plurality of first through-holes 11 (see FIG. 3), and each of the plurality of first through-holes 11 penetrates the insulating substrate 10 so as to reach the second main surface 10b from the first main surface 10a. Each of the plurality of first through-holes 11 is filled with the first via conductor 13. Each of a plurality of the first via conductors 13 has a substantially columnar shape.

The insulating substrate 10 is provided with a plurality of second through-holes 12 (see FIGS. 3 and 4), and each of the plurality of second through-holes 12 penetrates the insulating substrate 10 so as to reach the second main surface 10b from the first main surface 10a. Each of the plurality of second through-holes 12 is filled with the second via conductor 14. Each of a plurality of the plurality of second via conductors 14 has a substantially columnar shape.

Each of the plurality of first via conductors 13 constitutes a part of the first external connection line described above. Each of the plurality of second via conductors 14 constitutes a part of the second external connection line described above. That is, the plurality of first via conductors 13 and the plurality of second via conductors 14 respectively constitute the first external connection line and the second external connection line having different polarities.

As illustrated in FIGS. 1 to 4, in the present embodiment, four first via conductors 13 and five second via conductors 14 are provided in the insulating substrate 10, and thus a total of nine via conductors penetrate the insulating substrate 10. The nine via conductors are arranged in an array in a layout of three rows and three columns. Here, a polarity of one via conductor is different from a polarity of a via conductor adjacent thereto at the shortest distance.

The first via conductor 13 and the second via conductor 14 can be made of various wiring materials, and are preferably made of a metal material having particularly high electrical conductivity. A material of the first via conductor 13 and a material of the second via conductor 14 can be, for example, a metal material containing as a main material any one of Ni, Ag, Cu, Au, Pt, Mo, and W.

The axial lengths and the sizes of the first via conductor 13 and the second via conductor 14 are not particularly limited, and are appropriately set according to the thickness and the size of the insulating substrate 10. Here, the diameter of the first via conductor 13 and the diameter of the second via conductor 14 are preferably, for example, 0.05 mm to 0.25 mm. In the present embodiment, a conductor made of Ni having an axial length of 0.075 mm and a diameter of 0.125 mm is used as the first via conductor 13 and the second via conductor 14.

As illustrated in FIGS. 3 and 4, the connection conductor 15 is provided on the first main surface 10a of the insulating substrate 10 so as to cover the plurality of first via conductors 13. More specifically, the connection conductor 15 is provided in a portion of the first main surface 10a of the insulating substrate 10 where the first via conductor 13 is located and a portion adjacent to the first via conductor 13, and thus the connection conductor 15 is electrically connected to the first via conductor 13. On the other hand, the connection conductor 15 is not provided in a portion of the first main surface 10a of the insulating substrate 10 where the second via conductor 14 is located and a portion adjacent to the second via conductor 14, and thus the connection conductor 15 is electrically insulated from the second via conductor 14.

Here, the connection conductor 15 is formed of, for example, a land-like conductive layer having a predetermined thickness. In the present embodiment, the connection conductor 15 is formed of a single conductive layer, and is provided to cover the first main surface 10a in a region excluding positions corresponding to the plurality of second via conductors 14. Note that in FIG. 4, the connection conductor 15 is hatched for easy understanding.

Here, as illustrated in FIG. 4, when the insulating substrate 10 is viewed as one component before being assembled, the connection conductor 15 is provided at a position spaced apart outward from opening edges of the plurality of second through-holes 12 provided in the insulating substrate 10 by a predetermined distance, and thus the plurality of second through-holes 12 and the vicinity thereof are all exposed on the first main surface 10a side.

The connection conductor 15 constitutes a part of the first external connection line described above. That is, the connection conductor 15 constitutes the first external connection line out of the first external connection line and the second external connection line having different polarities.

The connection conductor 15 can be made of various wiring materials, and is preferably made of a metal material having particularly high electrical conductivity. A material of the connection conductor 15 can be a metal material made of, for example, any of Ni, Ag, Cu, Au, Pt, Mo, Ti, Cr, and W as a main material. In addition, the connection conductor 15 may be made of an alloy material containing two or more kinds selected from these metal materials as main components.

The thickness and size of the connection conductor 15 are not particularly limited, and in particular, the size is appropriately set according to the size of the insulating substrate 10. In the present embodiment, the connection conductor 15 made of an alloy of Ti and Ni and having a thickness of 200 nm is used. Here, in the present embodiment, a raw material of the connection conductor 15 itself is Ti, but as a result of Ni diffusing into Ti during firing, the connection conductor 15 is made of the alloy of Ti and Ni as described above.

As illustrated in FIGS. 1 to 3, a plurality of the first bumps 16 are provided on the second main surface 10b of the insulating substrate 10 so as to cover the plurality of first via conductors 13. The plurality of first bumps 16 serve as bonding materials for mounting the capacitor 1A as the surface mount electronic component on the wiring substrate or the like and electrically connecting the capacitance forming portion 20 of the capacitor 1A to the external circuit, and are provided to protrude from the second main surface 10b of the insulating substrate 10. The shape of each of the plurality of first bumps 16 is approximately hemispherical.

A plurality of the second bumps 17 are provided on the second main surface 10b of the insulating substrate 10 so as to cover the plurality of second via conductors 14. The plurality of second bumps 17 serve as bonding materials for mounting the capacitor 1A as the surface mount electronic component on the wiring substrate or the like and electrically connecting the capacitance forming portion 20 of the capacitor 1A to the external circuit, and are provided to protrude from the second main surface 10b of the insulating substrate 10. The shape of each of the plurality of second bumps 17 is approximately hemispherical.

Each of the plurality of first bumps 16 constitutes a part of the first external connection line described above. Each of the plurality of second bumps 17 constitutes a part of the second external connection line described above. That is, the plurality of first bumps 16 and the plurality of second bumps 17 respectively constitute the first external connection line and the second external connection line having different polarities.

The first bump 16 and the second bump 17 can be made of various wiring materials, and are preferably made of a metal material having particularly high electrical conductivity. A material of the first bump 16 and a material of the second bump 17 can be, for example, a metal material containing as a main material any one of Ni, Ag, Cu, Au, and Sn.

The sizes of the first bump 16 and the second bump 17 are not particularly limited, and are appropriately set according to the sizes of the first via conductor 13 and the second via conductor 14. In the present embodiment, the first bump 16 and the second bump 17 made of Au are used.

As described above, the first external connection line as the positive electrode of the pair of external connection lines is constituted by the first via conductor 13, the connection conductor 15, and the first bump 16, and the second external connection line as the negative electrode of the pair of external connection lines is constituted by the second via conductor 14 and the second bump 17.

As illustrated in FIG. 3, the capacitance forming portion 20 is provided on the insulating substrate 10 and includes the metal porous body 21 having a plurality of fine pores therein, a dielectric film 22 covering a surface of the metal porous body 21, and a conductive film 23 further covering a surface of the dielectric film 22.

At least a part of the plurality of fine pores provided inside the metal porous body 21 is not closed by the metal porous body itself, and preferably most or all of the plurality of fine pores provided inside the metal porous body is not closed by the metal porous body itself. Such a metal porous body is made of, for example, the sintered body of metal grain.

The metal porous body 21 is located on a portion of the insulating substrate 10 excluding an edge portion of the first main surface 10a. Thus, the metal porous body 21 is also located on the connection conductor 15 provided on the first main surface 10a, and is bonded to the connection conductor 15. Therefore, the first external connection line as the positive electrode described above is connected to the capacitance forming portion 20 with the connection conductor 15 interposed therebetween.

The metal porous body 21 can be made of various conductive metal materials, and is preferably made of a metal material containing as a main material any one of Ni, Mo, W, Al, Ti, Ta, Nb, Cu, Pt, Au, and Ag. In addition, the metal porous body 21 may be made of an alloy material containing two or more kinds selected from these metal materials as main components.

The thickness and size of the metal porous body 21 are not particularly limited, and in particular, the size is appropriately set according to the size of the insulating substrate 10. In the present embodiment, the metal porous body 21 made of Ni and having a thickness of 0.2 mm is used.

Here, as described above, the metal porous body 21 is preferably made of the sintered body of metal grain. In this case, metal grains having various shapes such as a spherical shape, an elliptical spherical shape, a flat shape, a plate shape, and a needle shape can be used. Further, the grain size of the metal grain is not particularly limited, but the average grain size is preferably 600 nm or less, and more preferably 20 nm to 500 nm.

The dielectric film 22 covers the surface of the metal porous body 21 as described above. More specifically, the dielectric film 22 covers not only the surface of the metal porous body 21 of a portion located on the outermost side of the capacitance forming portion 20 but also a surface defined by the above-described fine pores which are not closed by the metal porous body itself out of the surface of the metal porous body 21 of a portion located inside the capacitance forming portion 20.

The dielectric film 22 can be made of various insulating materials, and can be made of, for example, metal oxides such as $AlO_x$, $SiO_x$, $HfO_x$, $TiO_x$, $TaO_x$, $ZrO_x$, $SiAlO_x$, $HfAlO_x$, $ZrAlO_x$, $AlTiO_x$, $SrTiO_x$, $HfSiO_x$, $ZrSiO_x$, $TiZrO_x$, $TiZrO_x$, $TiZrWO_x$, $SrTiO_x$, $BaTiO_x$, $PbTiO_x$, $BaSrTiO_x$, and $BaCaTiO_x$, metal nitrides such as $AlN_x$, $SiN_x$, and $AlScN_x$, and metal oxynitrides such as $AlO_xN_y$, $SiO_xN_y$, $HfO_xN_y$, and $SiC_xO_yN_z$. Among them, the dielectric film 22 is preferably made of any one of $AlO_x$ (for example, $Al_2O_3$), $SiO_x$ (for example, $SiO_2$), $HfO_x$, $TiO_x$, $SiAlO_x$, $HfAlO_x$, $ZrAlO_x$, $HfSiO_x$, and $ZrSiO_x$. Note that the above chemical formula merely indicates the constitution of the material, and does not limit the composition. That is, x, y, and z attached to O and N may be any value larger than 0, and the abundance ratio of each element including a metal element is arbitrary. Furthermore, the dielectric film 22 may be made of a laminated film including a plurality of dielectric layers of different materials.

The dielectric film 22 can be preferably formed by a gas phase method, for example, a vacuum deposition method, a chemical vapor deposition (CVD) method, a sputtering method, an atomic layer deposition (ALD) method, a pulsed laser deposition (PLD) method, or the like, or a method using a supercritical fluid, and is particularly preferably formed by the ALD method.

The thickness of the dielectric film 22 is not particularly limited, but is preferably 3 nm to 100 nm, and more preferably 5 nm to 50 nm. In the present embodiment, the dielectric film 22 made of AlSiO and having a thickness of about 20 nm is used.

Here, when a substrate containing an inorganic oxide as a main material is used as the insulating substrate 10, it is preferable to use the metal oxide or the metal oxynitride as the dielectric film 22, and in particular when a substrate containing a binary inorganic oxide as a main material is used as the insulating substrate 10, the metal oxide can be suitably used as the dielectric film 22. With this constitution, a composition of the insulating substrate 10 and a composition of the dielectric film 22 are oxygen-bonded, and the composition of the dielectric film 22 is covalently bonded inside the dielectric film 22, so that close contact strength between the insulating substrate 10 and the dielectric film 22 can be increased.

The conductive film 23 covers the surface of the dielectric film 22 as described above. More specifically, the conductive film 23 covers not only the surface of the dielectric film 22 of the portion located on the outermost side of the capacitance forming portion 20 but also the surface of the dielectric film 22 of the portion located inside the capacitance forming portion 20.

The conductive film 23 can be made of various conductive materials, and can be made of a metal material containing as a main material any one of Ni, Cu, Ru, Al, W, Ti, Ag, Au, Zn, Ta, and Nb, an alloy material containing as a main component two or more kinds selected from these metal materials, a metal nitride such as TiN, TiAlN, TiSiN, TaN, NbN, or WN, a metal oxynitride such as TiON or TiAlON, a conductive polymer such as poly(3,4-ethylenedioxythiophene) (PEDOT), polypyrrole, or polyaniline, or a conductive oxide film such as $RuO_2$, ZnO, (Zn, Al)O, or NiO. Among them, the conductive film 23 is preferably made of TiN or an oxide semiconductor such as TiON, ZnO, or RuO.

The conductive film 23 can be preferably formed by the CVD method, the ALD method, the PLD method, a plating method, a bias sputtering method, a sol-gel method, a method using conductive polymer filling, or a method using a supercritical fluid, and is particularly preferably formed by the ALD method. Further, the conductive film 23 may be made of the laminated film including the plurality of dielectric layers of different materials. In this case, after film formation is performed by the ALD method, the film formation can be performed by another method.

The thickness of the conductive film 23 is not particularly limited, but is preferably 3 nm or more, and more preferably 10 nm or more. In the present embodiment, the conductive film 23 made of TiN and having a thickness of about 25 nm is used.

Here, the dielectric film 22 and the conductive film 23 described above cover not only the surface of the metal porous body 21 but also a predetermined portion of the insulating substrate 10 on the first main surface 10a side. That is, the dielectric film 22 and the conductive film 23 cover a surface of the connection conductor 15 provided on the first main surface 10a of the insulating substrate 10 and an exposed surface of the first main surface 10a of a portion not covered by the connection conductor 15.

Further, as illustrated in FIG. 5, the dielectric film 22 and the conductive film 23 also cover a surface of the insulating substrate 10 in a portion defining the second through-hole 12 provided in the insulating substrate 10. More specifically, at a boundary portion between the second via conductor 14 and a substrate of the insulating substrate 10, the substrate of the insulating substrate 10 is covered with the dielectric film 22, the dielectric film 22 is covered with the conductive film 23, and the conductive film 23 is covered with the second via conductor 14. In addition, an end portion of the second via conductor 14 on the first main surface 10a side is covered with the capacitance forming portion 20.

Thus, the conductive film 23 is bonded to the second via conductor 14. Therefore, the second external connection line as the negative electrode described above is connected to the capacitance forming portion 20 with the second via conductor 14 interposed therebetween.

As illustrated in FIGS. 1 to 3, the sealing portion 30 is provided on the first main surface 10a of the insulating substrate 10, and seals the capacitance forming portion 20 together with the insulating substrate 10. More specifically, the sealing portion 30 is positioned to cover the upper side and the side of the capacitance forming portion 20 provided on the first main surface 10a of the insulating substrate 10, and is further positioned to fill a hole provided inside the capacitance forming portion 20.

The sealing portion 30 can be made of various insulating materials, and is preferably made of an insulating material having excellent weather resistance. A material of the sealing portion 30 can be, for example, a resin material such as a polyimide resin, a polybenzoxazole resin, a polyethylene terephthalate resin, a benzocyclobutene resin, or an epoxy resin. In addition, the resin material can contain various additives, and for example, $SiO_2$ filler, $Al_2O_3$ filler, or the like may be contained in order to adjust the thermal expansion coefficient.

Note that when it is difficult to secure moisture resistance only with the sealing portion 30, a moisture-resistant protective film may be formed between the capacitance forming portion 20 and the sealing portion 30. For example, before the sealing portion 30 is formed, the moisture-resistant protective film can be formed by providing an inorganic insulator made of SiN, $SiO_2$, $Al_2O_3$, $HfO_2$, $ZrO_2$, or the like so as to cover the capacitance forming portion 20 by the CVD method, the ALD method, or the like, or by providing an organic insulator having water repellency such as a fluorine-based resin or a silane coupling agent resin so as to cover the capacitance forming portion 20. Here, the moisture-resistant protective film does not necessarily have to be formed up to the inside of the capacitance forming portion 20, and it is sufficient to be formed to cover only an outer surface of the capacitance forming portion 20.

The sealing portion 30 can be formed by various coating methods, and for example, a method using a vacuum laminator, a method using an air dispenser, a method using a jet dispenser, a screen printing method, a vacuum printing method, an electrostatic coating method, an inkjet method, a photolithography method, or the like can be used.

The thickness and size of the sealing portion 30 are not particularly limited, and in particular, the size is appropriately set according to the size of the insulating substrate 10. In the present embodiment, an epoxy resin having a size that covers the entire first main surface 10a of the insulating substrate 10 and a thickness of 0.04 mm that covers the entire capacitance forming portion 20 is used as the sealing portion 30.

With the above configuration, in the capacitor 1A according to the present embodiment, the capacitance forming portion 20 including the metal porous body 21, the dielectric film 22, and the conductive film 23 is sealed by the insulating substrate 10 and the sealing portion 30, and electrical extension of the capacitance forming portion 20 is achieved by the pair of external connection lines.

Here, in the capacitor 1A according to the present embodiment, as described above, the connection conductor 15 is provided on the insulating substrate 10 so as to cover the first via conductor 13, and the capacitance forming portion 20 is provided on the insulating substrate 10 so as to cover the connection conductor 15 and the second via conductor 14. Therefore, when viewed in a normal direction of the first main surface 10a of the insulating substrate 10, the first via conductor 13 and the second via conductor 14 are both provided in a region where the capacitance forming portion 20 is disposed (that is, a region indicated by a broken line in FIG. 2).

With such a configuration, neither the first external connection line nor the second external connection line is arranged in a position on the side of the capacitance forming portion 20, so that it is possible to minimize the sealing portion 30 in a portion located on the side of the capacitance forming portion 20. Therefore, not only the capacitor 1A can be made smaller than the conventional one, but also an occupied volume of a portion other than the capacitance forming portion 20 in the capacitor 1A is smaller, so that capacitance can be increased.

In addition, in the case of the above configuration, since the first via conductor 13 and the second via conductor 14 are positioned to penetrate the insulating substrate 10 in a thickness direction thereof, the via conductors having different polarities are arranged close to each other in a state where current paths thereof face in opposite directions. Therefore, since magnetic fields generated in the via conductors act to cancel each other by current flowing, low ESL is achieved.

Therefore, by using the capacitor 1A according to the present embodiment, the capacitor including the capacitance forming portion 20 including the metal porous body 21, the dielectric film 22, and the conductive film 23 can achieve low ESL and high capacitance.

Note that in the capacitor 1A according to the present embodiment, as described above, the first via conductor 13 and the second via conductor 14 are arranged in an array, and the polarity of one via conductor is different from the polarity of a via conductor adjacent thereto at the shortest distance. With this configuration, an effect of reducing the ESL described above can be maximized.

In addition, in the capacitor 1A according to the present embodiment, as described above, each of the pair of external connection lines that electrically extends the capacitance forming portion 20 is configured to include a plurality of via conductors. With this configuration, a sectional area of the current path can be increased as compared with a case where each of the pair of external connection lines is formed by a single via conductor, and thus so-called equivalent series resistance (ESR) can also be reduced.

In addition, in the capacitor 1A according to the present embodiment, as described above, the connection conductor 15 including the land-like conductive layer is provided on the first main surface 10a of the insulating substrate 10, and the metal porous body 21 is bonded to the connection conductor 15. With this configuration, bondability between the capacitance forming portion 20 and the insulating substrate 10 is improved, and it is possible to suppress warpage that may occur in the metal porous body 21. Therefore, also when the thickness of the metal porous body 21 is reduced, it is not necessary to form the sealing portion 30 thick in order to suppress occurrence of warpage, so that miniaturization and high capacity can be achieved also in that sense. In addition, by adopting this configuration, a contact area between the metal porous body 21 and the first external connection line can be increased, so that the ESR can also be reduced by reducing the contact resistance.

In addition, in the capacitor 1A according to the present embodiment, as described above, at the boundary portion between the second via conductor 14 and the substrate of the insulating substrate 10, the substrate of the insulating substrate 10 is covered with the dielectric film 22, the dielectric film 22 is covered with the conductive film 23, and the conductive film 23 is covered with the second via conductor 14. With this configuration, close contact between the substrate of the insulating substrate 10 and the second via conductor 14 is improved as compared with a case where the substrate of the insulating substrate 10 and the second via conductor 14 are directly bonded, so that entry of moisture through the portion can be suppressed. Therefore, a capacitor excellent in moisture resistance can be obtained.

Further, in the capacitor 1A according to the present embodiment, as described above, the metal porous body 21 is made of the sintered body of metal grain. With such a configuration, mechanical strength of the capacitance forming portion 20 is increased by metal bonding between the metal grains, and a bonding area between the metal grains is also increased, so that the ESR can be reduced. Furthermore, an effect of relatively easily forming a metal porous body having open pores is also obtained.

Figure 6:
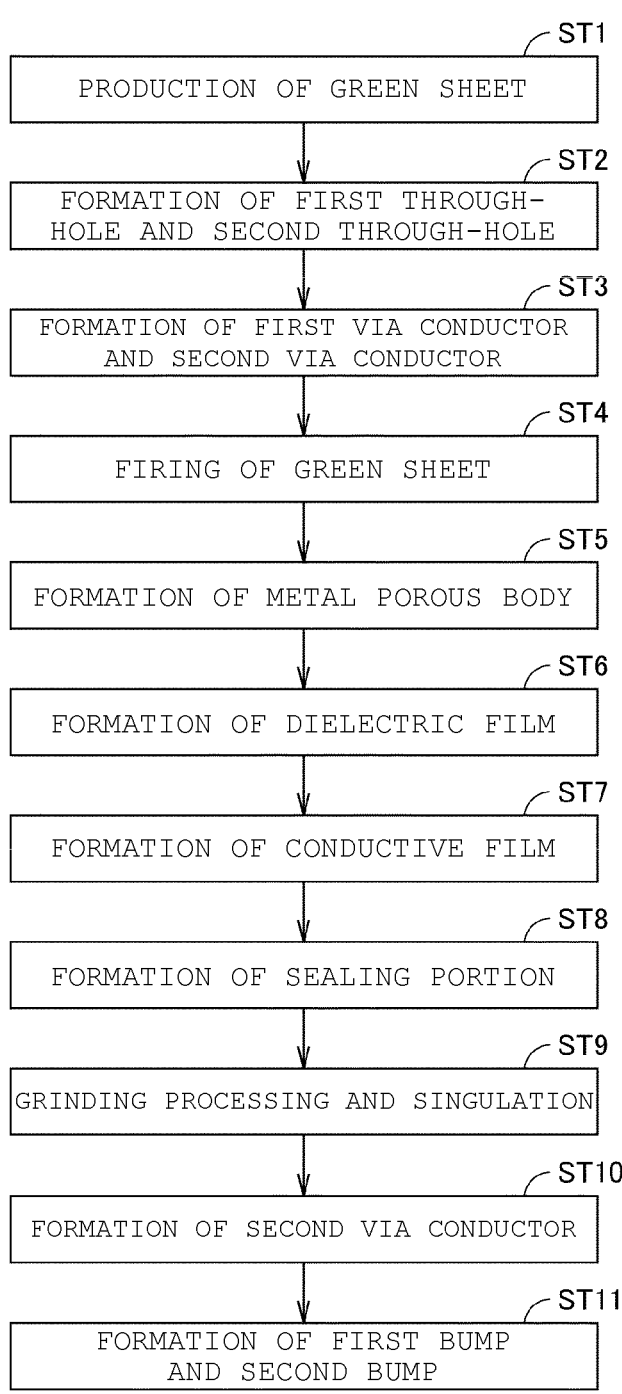
FIG. 6 is a flowchart illustrating a method for manufacturing the capacitor according to the first embodiment.
Figure 8:
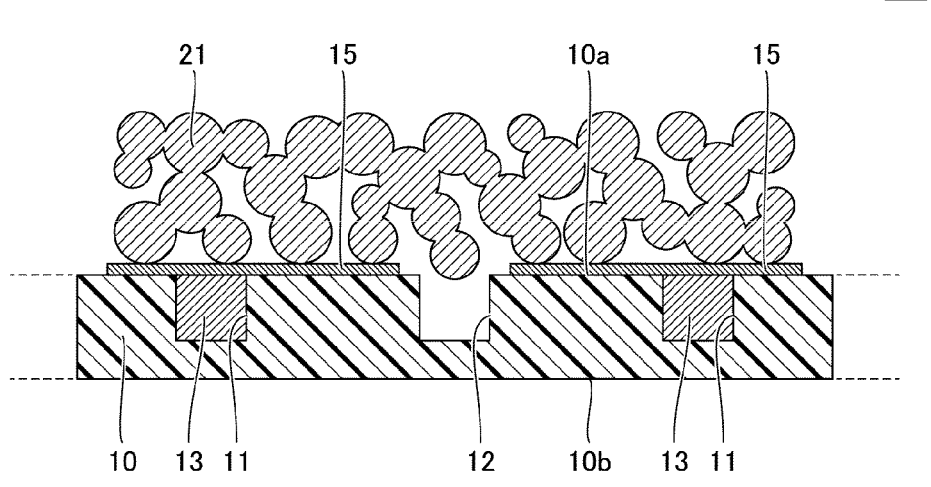
FIG. 8 is a schematic sectional view for explaining step ST5 of the manufacturing flow illustrated in FIG. 6.
Figure 9:
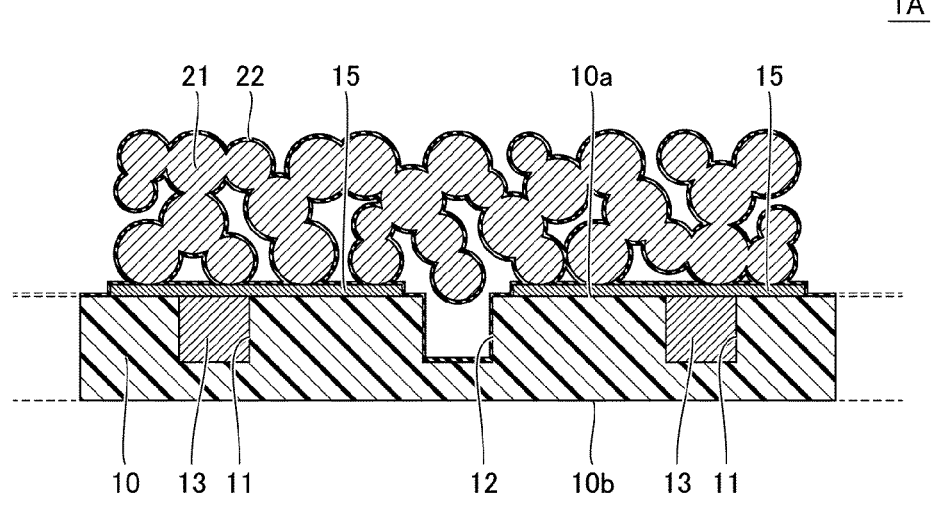
FIG. 9 is a schematic sectional view for explaining step ST6 of the manufacturing flow illustrated in FIG. 6.
Figure 10:
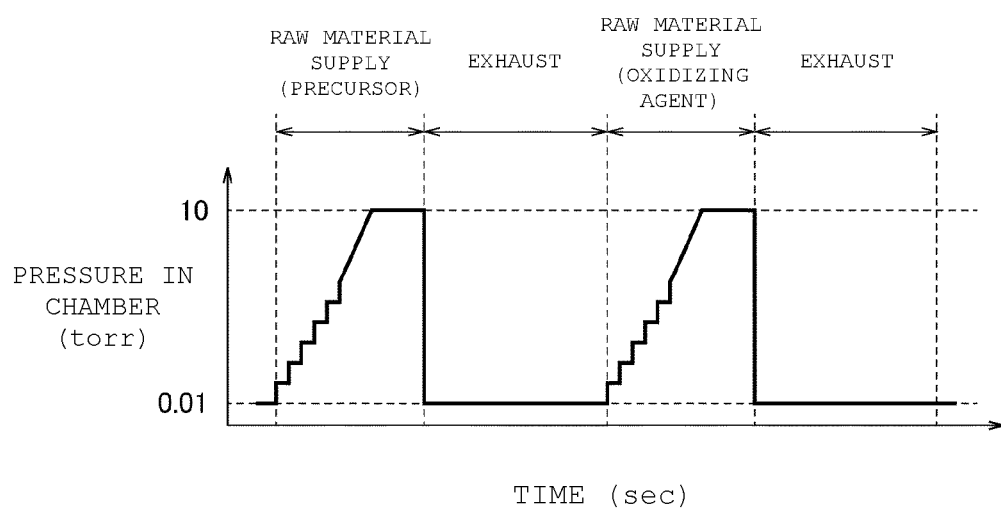
FIG. 10 is a graph for explaining manufacturing conditions in step ST6 of the manufacturing flow illustrated in FIG. 6.

FIG. 6 is a flowchart illustrating a method for manufacturing the capacitor according to the present embodiment. FIGS. 7 to 9 and FIGS. 11 to 14 are schematic sectional views for respectively explaining steps of a manufacturing flow illustrated in FIG. 6. Further, FIG. 10 is a graph for explaining manufacturing conditions in step ST6 of the manufacturing flow illustrated in FIG. 6. Next, an example of a specific manufacturing method for manufacturing the capacitor 1A according to the present embodiment described above will be described with reference to FIGS. 6 to 14.

The method for manufacturing the capacitor 1A described below is a method for simultaneously mass-producing a plurality of capacitors 1A by collectively performing processing up to a middle stage of a manufacturing process to produce an assembly of capacitors in process, thereafter the assembly is singulated by dividing, and further subjecting a product in process after singulation to processing.

First, as illustrated in FIG. 6, in step ST1, a green sheet is produced. Specifically, $Al_2O_3$ powder and glass powder are weighed, and the $Al_2O_3$ powder and the glass powder, an organic solvent such as toluene or ethanol, and a binder such as polyvinyl butyral are mixed. Thereafter, the mixture is formed into a sheet shape, thereby producing the green sheet as a base of the insulating substrate. Note that after production of the green sheet, the green sheet is cut to prepare a plurality of green sheets.

Next, as illustrated in FIG. 6, in step ST2, a first through-hole and a second through-hole are formed in a part of the plurality of green sheets. Specifically, at a predetermined position of the green sheet, the first through-hole to be filled later with the first via conductor that is a part of the positive electrode is provided, and the second through-hole to be filled later with the second via conductor that is a part of the negative electrode is provided.

Here, a method for forming the first through-hole and the second through-hole is not particularly limited, but for example, the first through-hole and the second through-hole can be formed by irradiating the green sheet with laser light. In addition, the first through-hole and the second through-hole may also be formed by processing using a mechanical puncher or sandblasting.

Next, as illustrated in FIG. 6, in step ST3, the first via conductor and the connection conductor are formed in the green sheet in which the first through-hole and the second through-hole are formed. Specifically, conductive paste is applied to the green sheet so that the first through-hole is filled and a land-like portion is formed on one main surface of the green sheet continuously to a portion in which the first through-hole is filled. Note that at that time, the second through-hole is not filled with the conductive paste.

Here, the method for applying the conductive paste is not particularly limited, but for example, the screen printing method can be used.

Next, as illustrated in FIG. 6, in step ST4, the green sheet is fired. Specifically, the green sheet not provided with the first through-hole, the second through-hole, or the like is superposed on the green sheet applied with the conductive paste in step ST3, and the superposed green sheets are pressure-bonded. Then, a laminate of green sheets after pressure bonding is subjected to a degreasing treatment, and then the laminate of green sheets after the degreasing treatment is fired.

Here, when the green sheets are laminated, the green sheet not provided with the first through-hole, the second through-hole, or the like is laminated on the other main surface facing the one main surface of the green sheet applied with the conductive paste. Further, when the green sheets are pressure-bonded, for example, a uniaxial pressing machine can be used. Further, the green sheet is fired, for example, under a temperature condition of 700° C. to 1000° C. in an air atmosphere.

Figure 7:
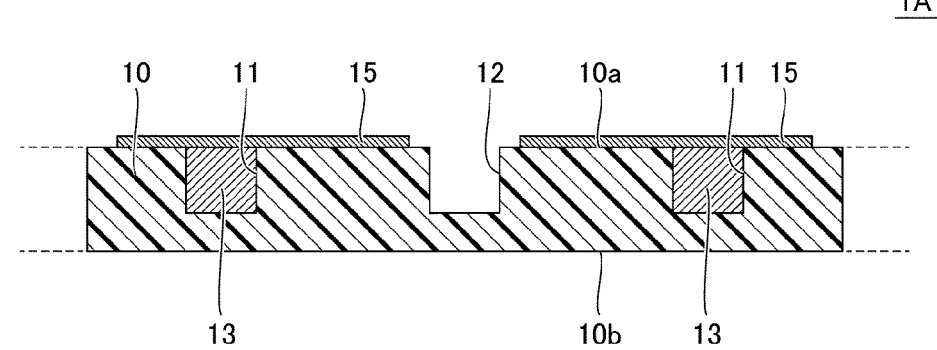
FIG. 7 is a schematic sectional view illustrating a state after completing step ST4 of a manufacturing flow illustrated in FIG. 6.

Through steps ST1 to ST4 described above, the insulating substrate as illustrated in FIG. 7 is obtained. Here, the insulating substrate is a so-called multiple substrate in which insulating substrates to be finally included respectively in the plurality of capacitors are connected in a matrix, but in FIG. 7, only one of the insulating substrates 10 is focused on, and a peripheral portion thereof is illustrated to be omitted by broken lines.

Note that in the insulating substrate 10, the thickness of the connection conductor 15 formed on the first main surface 10a may vary. Therefore, in order to increase flatness of the surface of the connection conductor 15, the connection conductor 15 may be polished after firing.

In the above description, a case where the first through-hole and the second through-hole are formed in step ST2, and then the first via conductor and the connection conductor are provided in step ST3 has been exemplified, but only the first through-hole may be formed first, and the second through-hole may be formed after the first via conductor and the connection conductor are formed.

Further, in the above description, a case where the green sheet and the conductive paste are simultaneously fired has been described as an example, but the first via conductor, the connection conductor, and the second through-hole may be provided after the insulating substrate not provided with the through-hole or the like is fired. In this case, the first through-hole and the second through-hole may be provided in the fired insulating substrate by, for example, a sandblasting method, a wet etching method, a dry etching method, or the like, and then the conductive paste may be applied and fired. In addition, the first via conductor and the connection conductor may be formed by sputtering, vapor deposition, plating, or the like.

Next, as illustrated in FIG. 6, in step ST5, the metal porous body is formed. More specifically, as illustrated in FIG. 8, the metal porous body 21 is formed on the first main surface 10a of the insulating substrate 10.

Here, before the metal porous body 21 is formed, the second through-hole 12 provided in the insulating substrate 10 is preferably provided with a closing portion that closes the second through-hole 12 by applying an epoxy resin or the like (not illustrated). This is to prevent the conductive paste for forming the metal porous body 21 to be described later from entering the inside of the second through-hole 12.

Next, conductive metal grains, an organic solvent such as terpineol, and a varnish of ethyl cellulose are weighed and mixed, and the conductive paste is produced based on the mixture by using a roll machine. The conductive paste thus prepared is applied onto the first main surface 10a of the insulating substrate 10 and dried.

At this time, the conductive paste is overapplied a plurality of times, whereby the conductive paste is applied onto the insulating substrate 10 so as to have a predetermined thickness. In addition, the conductive paste is applied not only onto the connection conductor 15 but also onto the second through-hole 12 covered with the above-described closed portion (not illustrated) so as to have a rectangular pattern shape as a whole in plan view. The individual conductive paste applied onto the insulating substrate 10 is the metal porous body 21 described above.

Next, the insulating substrate 10 after being applied with the conductive paste is subjected to the degreasing treatment, and then the conductive paste is fired, for example, under a temperature condition of 400° C. to 900° C. in a reducing atmosphere in which nitrogen and hydrogen are mixed. Thus, adjacent metal grains contained in the conductive paste form a neck, and metal bonding occurs between the connection conductor 15 and the metal grain in a portion contacting the connection conductor 15, and as a result, the metal porous body 21 is formed, and the metal porous body 21 is bonded to the connection conductor 15.

Here, at the time of the above-described firing, the closed portion that has closed the second through-hole 12 and is made of, for example, an epoxy resin is burned out by the heat. Thus, as illustrated in FIG. 8, the second through-hole 12 is opened again, and the metal porous body 21 is positioned to face a cavity of the second through-hole 12.

Note that the atmosphere at the time of firing is preferably the reducing atmosphere as described above, but can be set to an atmosphere of an equilibrium oxygen partial pressure or less of a metal selected as a main component of the metal porous body 21.

Next, as illustrated in FIG. 6, the dielectric film is formed in step ST6. More specifically, as illustrated in FIG. 9, the dielectric film 22 is formed to cover the surface of the metal porous body 21 and cover the surface of the insulating substrate 10 in a portion defining the second through-hole 12 provided in the insulating substrate 10.

Here, a method for forming the dielectric film 22 is not particularly limited as described above, but the ALD method is preferably used. By using the ALD method, since a raw material of the dielectric film 22 can be supplied by gas, the material can be selected and the film thickness can be adjusted at an atomic layer level. Therefore, also when the fine pores provided inside the metal porous body 21 are extremely small, a homogeneous and dense dielectric film 22 can be formed. In addition, by using the ALD method, the surface of the insulating substrate 10 in the portion defining the second through-hole 12 provided in the insulating substrate 10 can also be easily covered with the dielectric film 22.

When the dielectric film 22 is formed by using the ALD method, it is preferable to use, as a raw material gas, a raw material gas having a high vapor pressure, easy gasification, high thermal stability, and high reactivity so that the raw material gas spreads over the fine pores provided in the metal porous body 21 and the inside of the second through-hole 12 provided in the insulating substrate 10. From this viewpoint, for example when an $AlO_x$ film is formed, trimethylaluminum (TMA) is preferably used as a raw material, and when an $SiO_x$ film is formed, trisdimethylaminosilane (TDMAS) is preferably used as the raw material.

Here, at the time of film formation by the ALD method, it is preferable to adjust exhaust conductance by providing an automatic pressure control (APC) valve in an ALD film forming device, and thereby supply the raw material and reaction gas to a workpiece while increasing a gas partial pressure in a reaction chamber. That is, at the time of film formation of the dielectric film 22, the raw material gas needs to be sucked not only in the reaction chamber, but also in the fine pores provided inside the metal porous body 21 and the inside of the second through-hole 12 provided in the insulating substrate 10, and thus it is preferred that the gas partial pressure in the reaction chamber is sufficiently increased.

Specifically, for example, as illustrated in FIG. 10, when the pressure in the reaction chamber reaches about 10 torr, degree of opening of an APC valve is adjusted to maintain the pressure, so that the raw material gas (precursor) is spread and sucked to the fine pores provided inside the metal porous body 21 and the inside of the second through-hole 12 provided in the insulating substrate 10.

Thereafter, supply of the source gas is stopped, and exhaust is performed by increasing the degree of opening of the APC valve for 30 seconds or more, to reduce the pressure in the reaction chamber to 0.01 torr, thereby fully exhausting the raw material gas.

Subsequently, it is necessary to supply another raw material gas (an oxidizing agent) in order to react the sucked gas, and this is also performed in the same manner as in the case of the raw material gas (precursor) described above, so that the other raw material gas (oxidizing agent) is spread in the fine pores provided inside the metal porous body 21 and the inside of the second through-hole 12 provided in the insulating substrate 10.

By repeating this series of operations, the dielectric film 22 having a desired thickness is formed. Note that a film forming condition described above is merely an example, and various changes can be made.

Figure 11:
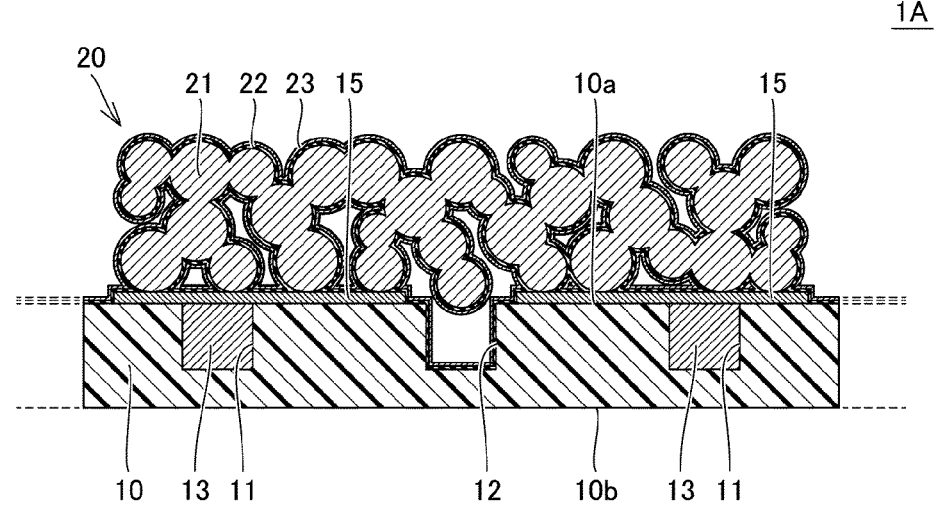
FIG. 11 is a schematic sectional view for explaining step ST7 of the manufacturing flow illustrated in FIG. 6.

Next, as illustrated in FIG. 6, the conductive film is formed in step ST7. More specifically, as illustrated in FIG. 11, the conductive film 23 is formed to cover the dielectric film formed in step ST6.

Here, a method for forming the conductive film 23 is not particularly limited as described above, but the ALD method is preferably used. By using the ALD method, since a raw material of the conductive film 23 can be supplied by gas, the material can be selected and the film thickness can be adjusted at the atomic layer level. Therefore, also when the fine pores provided inside the metal porous body 21 are extremely small, a homogeneous and dense conductive film 23 can be formed. In addition, by using the ALD method, the dielectric film 22 provided inside the second through-hole 12 of the insulating substrate 10 can also be easily covered with the conductive film 23.

Note that, although detailed description is omitted here, if the conductive film 23 is formed under substantially the same conditions as the above-described film forming condition of the dielectric film 22, the conductive film 23 having a desired thickness can be easily formed. However, the film forming condition of the conductive film 23 can be variously changed.

Through steps ST5 to ST7 described above, as illustrated in FIG. 11, the capacitance forming portion 20 including the metal porous body 21, the dielectric film 22, and the conductive film 23 is formed on the first main surface 10*a* of the insulating substrate 10.

Figure 12:
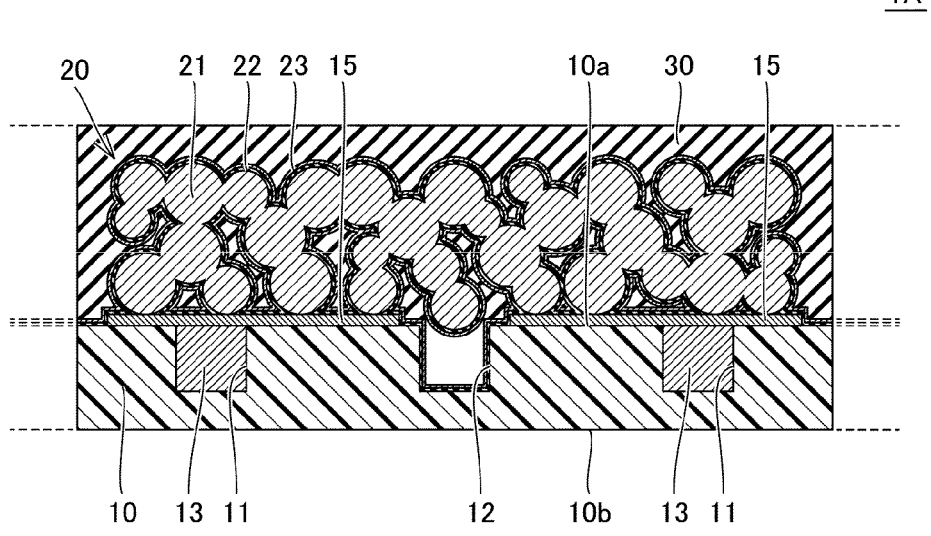
FIG. 12 is a schematic sectional view for explaining step ST8 of the manufacturing flow illustrated in FIG. 6.

Next, as illustrated in FIG. 6, the sealing portion is formed in step ST8. Specifically, as illustrated in FIG. 12, the sealing portion 30 is provided on the first main surface 10*a* of the insulating substrate 10 provided with the capacitance forming portion 20 so as to cover the capacitance forming portion 20.

For example, when the sealing portion 30 is formed, a resin sheet is put on the first main surface 10*a* of the insulating substrate 10, and in this state, the resin sheet is brought into close contact with the first main surface 10*a* of the insulating substrate 10 by performing evacuation using the vacuum laminator. Then, in this state, the resin sheet is heated to 50° C. to 100° C. to laminate the capacitance forming portion 20, and then heated to 100° C. to 200° C. to perform main curing, thereby forming the sealing portion 30.

Thus, the capacitance forming portion 20 is sealed by the insulating substrate 10 and the sealing portion 30, and the moisture can be prevented from entering the capacitance forming portion 20 from the outside, so that the moisture resistance can be secured. In addition, the capacitance forming portion 20 is covered with the sealing portion 30, and the capacitance forming portion 20 is physically protected by the sealing portion 30. Note that a curing condition described above is merely an example, and various changes can be made.

Figure 13:
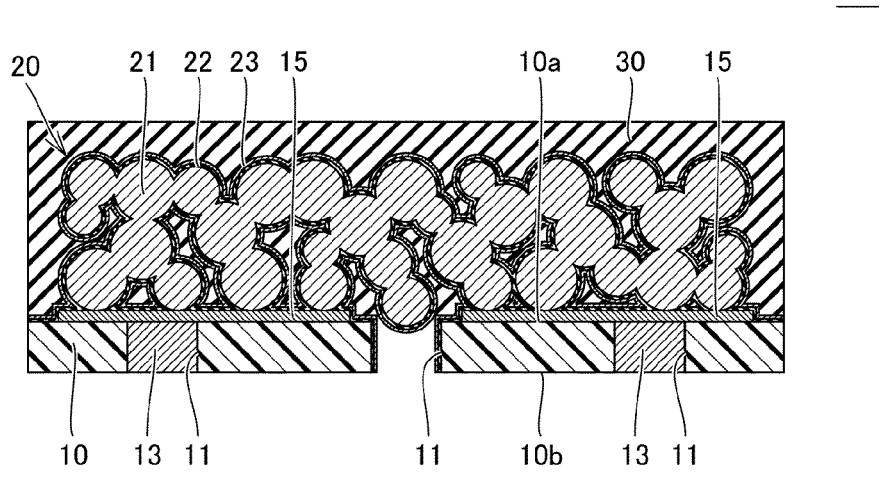
FIG. 13 is a schematic sectional view for explaining step ST9 of the manufacturing flow illustrated in FIG. 6.

Next, as illustrated in FIG. 6, in step ST9, the insulating substrate after the sealing portion is provided is subjected to grinding processing, and then is singulated. Specifically, as illustrated in FIG. 13, planar cutting is performed on the second main surface 10*b* side of the insulating substrate 10 located on a side opposite to a side on which the sealing portion 30 is provided, and then, the insulating substrate 10 is divided, so that the plurality of capacitors 1A in a state of being connected to each other is singulated.

Here, when the grinding processing is performed, a grinding tape (not illustrated) is attached to the sealing portion 30 side, and the insulating substrate 10 at portions that close the first via conductor 13 and the second through hole 12 are removed by planar cutting. Thus, an end portion of the first via conductor 13 is exposed on the second main surface 10*b* side, and an end portion of the second through-hole 12 is exposed on the second main surface 10*b* side.

In addition, when the singulation is performed, a groove is formed in the insulating substrate 10, and a force is applied to the insulating substrate 10 so as to be bent from the groove as a starting point, so that the insulating substrate 10 is divided. Note that as a method for forming the groove, diamond scribing, laser scribing, dicing, or the like can be used. Further, the singulation may be performed by directly cutting the insulating substrate 10 and the sealing portion 30 by scribing or dicing.

Figure 14:
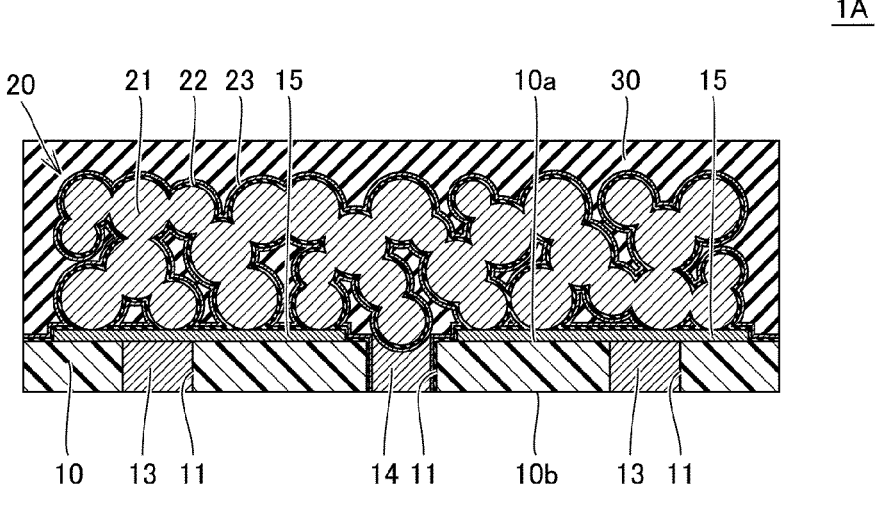
FIG. 14 is a schematic sectional view for explaining step ST10 of the manufacturing flow illustrated in FIG. 6.

Next, as illustrated in FIG. 6, the second via conductor is formed on the insulating substrate in step ST10. Specifically, as illustrated in FIG. 14, the second via conductor 14 is formed so as to fill the second through-hole 12 provided in the insulating substrate 10.

The second via conductor 14 can be formed by, for example, electrolytic plating. In this case, a portion other than the second through-hole 12 is covered with an ultraviolet curable resin film as a mask (not illustrated), and electrolytic plating is performed in this state, so that only the inside of the second through-hole 12 can be covered with a plating film. Note that after completion of the electrolytic plating, the ultraviolet curable resin film as the mask is removed.

Next, as illustrated in FIG. 6, in step ST11, the first bump and the second bump are formed on the insulating substrate. Specifically, the first bump 16 and the second bump 17 are formed on the second main surface 10*b* of the insulating substrate 10 so as to cover the first via conductor 13 and the second via conductor 14 provided on the insulating substrate 10.

The first bump 16 and the second bump 17 can be simultaneously formed by, for example, electrolytic plating. In this case, a portion other than the vicinity of portions where the first via conductor 13 and the second via conductor 14 are exposed is covered with the ultraviolet curable resin film as the mask (not illustrated), and the electrolytic plating is performed in this state, so that the first bump 16 and the second bump 17 can be formed to protrude from the second main surface 10*b*, and after the electrolytic plating is completed, the ultraviolet curable resin film as the mask is removed.

Note that the method for forming the second via conductor 14, the first bump 16, and the second bump 17 described above is not limited to the method using the electrolytic plating described above, and a combination of the screen printing method using the conductive paste, the inkjet method, a dispenser method, or the like and firing can also be used. In that case, the conductive paste preferably contains a metal or a sintering aid that can be fired at a low temperature so that firing can be performed under a temperature condition that does not affect a resin constituting the sealing portion 30.

The capacitor 1A according to the first embodiment described above is manufactured through steps ST1 to ST11 described above.

Note that, in the method for manufacturing the capacitor 1A according to the present embodiment described above, a case where the grinding processing and the singulation are performed after the sealing portion is formed has been exemplified, but the sealing portion may be formed after the grinding processing and the singulation are performed. In addition, after the sealing portion is formed, the groove for singulation may be formed, and then the singulation may be performed by performing grinding processing.

Here, as described above, regarding the grain size of the metal grains to be the metal porous body 21, the average grain size is preferably 600 nm or less, and more preferably 20 nm to 500 nm, but the grain size of the metal grains can be calculated from a specific surface area by a BET method. In trial production conducted by the present inventors, the specific surface area of the metal grain was measured with BELSORP MAX manufactured by MicrotracBEL Corp.

In the trial production, the metal porous body was produced by sintering the conductive metal grains according to the method for manufacturing the capacitor 1A according to the present embodiment described above. The crystallite diameter of this metal porous body was 80 nm in terms of D50 diameter. The evaluation was performed as follows.

First, the capacitor embedded with the resin was polished to reach its central portion. Next, the obtained polished surface was processed by a focused ion beam processing apparatus (FIB) at an incident angle of 5° to remove sagging caused by polishing on the polished surface. Next, a channeling contrast image of the polished surface was captured using a scanning ion microscope (SIM), this was binarized by image processing, the equivalent circle diameter was measured using this, and the D50 diameter was calculated.

Note that the crystallite diameter of the metal porous body usually varies depending on the method for preparing the metal grain to be used and heat treatment conditions (temperature, atmosphere, time, and the like) for preparing the metal porous body, but as described above, when the average particle diameter is 600 nm or less, and more preferably 20 nm to 500 nm, it is possible to obtain the effect that the thickness of the metal portion of the metal porous body can be reduced, that is, the capacity can be increased.

First to Eighth Modifications

Figures 15A, 15B, 15C:
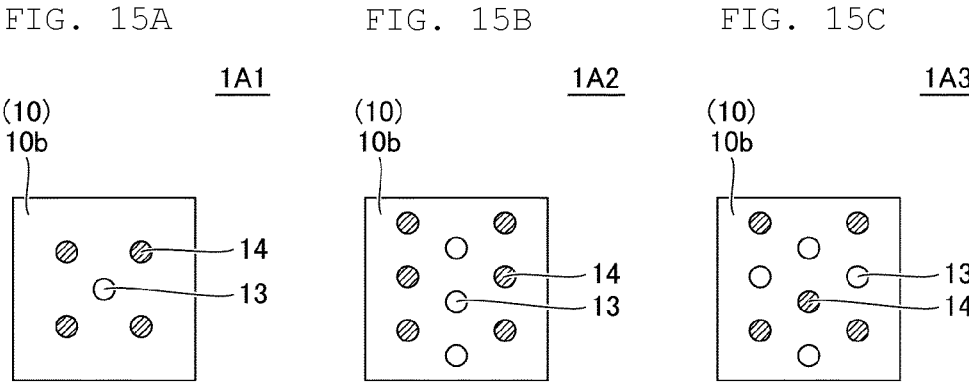
FIGS. 15A to 15C are schematic bottom views of the insulating substrate of the capacitor according to first to third modifications.
Figures 16A, 16B, 16C, 16D, 17:
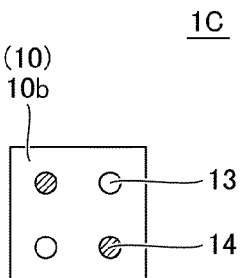
FIGS. 16A to 16D is a schematic bottom view of the insulating substrate of the capacitor according to fourth to seventh modifications.
FIG. 17 is a schematic bottom view of the insulating substrate of the capacitor according to an eighth modification.

FIGS. 15A to 15C are schematic bottom views of the insulating substrate of the capacitor according to first to third modifications. Further, FIGS. 16A to 16D are schematic bottom views of the insulating substrate of the capacitor according to the fourth to seventh modifications, and FIG. 17 is a schematic bottom view of the insulating substrate of the capacitor according to an eighth modification. Next, capacitors 1A1 to 1A3, 1B1 to 1B4, and 1C according to the first to eighth modifications based on the above-described first embodiment will be described with reference to FIGS. 15A to 15C, 16A to 16D and 17. Note that, in FIGS. 15A to 15C, 16A to 16D and 17, for easy understanding, the first bump 16 and the second bump 17 (see FIG. 2) are not illustrated, and the second via conductor 14 is hatched.

As illustrated in FIGS. 15A to 15C, the capacitors 1A1 to 1A3 according to the first to third modifications have the same size (outer shape) (the insulating substrate 10 has a square shape with a side length of 0.68 mm in plan view) but are different in the number and layout of the first via conductors 13 and the second via conductors 14 as compared with the capacitor 1A according to the first embodiment described above. Specifically, the first via conductors 13 and the second via conductors 14 are arranged in a staggered manner when viewed as a whole.

As illustrated in FIG. 15A, in the capacitor 1A1 according to the first modification, only one first via conductor 13 is provided at the center of the insulating substrate 10, and four second via conductors 14 are provided around the first via conductor 13. As illustrated in FIG. 15B, in the capacitor 1A2 according to the second modification, three first via conductors 13 are provided in a row at the center of the insulating substrate 10, and three second via conductors 14 are provided in a row on each of the left and right sides of the insulating substrate. As illustrated in FIG. 15C, in the capacitor 1A3 according to the third modification, the layout of the via conductors is the same as that of the capacitor 1A2 according to the second modification, but the first via conductor 13 and the second via conductor 14 are provided to surround each other.

In any of the capacitors 1A1 to 1A3 according to the first to third modifications described above, when viewed in the normal direction of the first main surface 10a of the insulating substrate 10, the first via conductor 13 and the second via conductor 14 are both provided in the region where the capacitance forming portion 20 is disposed. Therefore, as in the case of the capacitor 1A according to the first embodiment described above, low ESL and high capacitance are achieved.

Here, as a result of simulation of the generated magnetic field, it has been confirmed that the ESL is more effectively reduced in the capacitor 1A according to the first embodiment and the capacitors 1A2 and 1A3 according to the second and third modifications in which the number of via conductors is larger than that in the capacitor 1A1 according to the first modification in which the number of via conductors is small, and it has been also confirmed that the ESL is more effectively reduced in the capacitor 1A according to the first embodiment and the capacitor 1A3 according to the third modification in which the polarities of the via conductors arranged close to each other are more uniformly and alternately arranged than in the capacitors 1A1 and 1A2 according to the first and second modifications in which the polarities of the via conductors arranged close to each other are arranged unevenly.

As illustrated in FIGS. 16A to 16D, the capacitors 1B1 to 1B4 according to the fourth to seventh modifications are larger in size (outer shape) (the insulating substrate 10 has a square shape with a side length of 0.93 mm in plan view) than the capacitor 1A according to the first embodiment described above, and accordingly, the numbers and layouts of the first via conductors 13 and the second via conductors 14 are different. Specifically, the total number of the first via conductors 13 and the second via conductors 14 is larger than that of the capacitor 1A according to the first embodiment described above, and the first via conductors and the second via conductors are arranged in a matrix shape or a staggered manner as a whole.

As illustrated in FIG. 16A, in the capacitor 1B1 according to the fourth modification, the first via conductors 13 and the second via conductors 14 are arranged in a staggered manner when viewed as a whole, and further, the first via conductors 13 and the second via conductors 14 are provided to surround each other. Here, the number of first via conductors 13 is four, and the number of second via conductors 14 is nine.

As illustrated in FIG. 16B, in the capacitor 1B2 according to the fifth modification, the first via conductor 13 and the second via conductor 14 are arranged in four rows and four columns in a matrix shape as a whole, and further, the first via conductor 13 and the second via conductor 14 are provided to surround each other. Here, the number of first via conductors 13 is eight, and the number of second via conductors 14 is eight.

As illustrated in FIG. 16C, in the capacitor 1B3 according to the sixth modification, the first via conductor 13 and the second via conductor 14 are arranged in five rows and five columns in a matrix shape as a whole, and further, the first via conductor 13 and the second via conductor 14 are provided to surround each other. Here, the number of first via conductors 13 is thirteen, and the number of second via conductors 14 is twelve.

As illustrated in FIG. 16D, in the capacitor 1B4 according to the seventh modification, the first via conductor 13 and the second via conductor 14 are arranged in a staggered manner when viewed as a whole, and further, the first via conductor 13 and the second via conductor 14 are provided to surround each other. Here, the number of first via conductors 13 is nine, and the number of second via conductors 14 is sixteen.

In any of the capacitors 1B1 to 1B4 according to the above-described fourth to seventh modifications, when viewed in the normal direction of the first main surface 10a of the insulating substrate 10, the first via conductor 13 and the second via conductor 14 are both provided in the region where the capacitance forming portion 20 is disposed. Therefore, as in the case of the capacitor 1A according to the first embodiment described above, low ESL and high capacitance are achieved.

Here, as a result of simulation of the generated magnetic field, it has been confirmed that the ESL is more effectively reduced in the capacitors 1B3 and 1B4 according to the sixth and seventh modifications in which the number of via conductors is larger than that in the capacitors 1B1 and 1B2 according to the fourth and fifth modifications in which the number of via conductors is small.

As illustrated in FIG. 17, the capacitor 1C according to the eighth modification has a small size (outer shape) (the insulating substrate 10 has a square shape with a side length of 0.43 mm in plan view) as compared with the capacitor 1A according to the first embodiment described above, and accordingly, the numbers and layouts of the first via conductors 13 and the second via conductors 14 are different. Specifically, the total number of the first via conductors 13 and the second via conductors 14 is four, which is smaller than that of the capacitor 1A according to the first embodiment described above, and the first via conductors and the second via conductors are arranged in two rows and two columns in a matrix shape as a whole.

Also in the capacitor 1C according to the eighth modification, when viewed in the normal direction of the first main surface 10a of the insulating substrate 10, the first via conductor 13 and the second via conductor 14 are both provided in the region where the capacitance forming portion 20 is disposed. Therefore, as in the case of the capacitor 1A according to the first embodiment described above, low ESL and high capacitance are achieved.

Note that as a result of simulation of the magnetic field generated by variously changing the diameter of the first via conductor 13, the diameter of the second via conductor 14, and an interval between the adjacent via conductors while adopting the layout of the first via conductor 13 and the second via conductor 14 according to the first embodiment described above, it has been confirmed that reduction in ESL is further increased when the diameter of the via conductor is larger, and the reduction in ESL is further increased when the interval between the adjacent via conductors is smaller.

From the above, it can be understood that the total number of via conductors including the first via conductors 13 and the second via conductors 14 is set to four or more, and the diameter of the first via conductors 13 and the diameter of the second via conductors 14 are both set to 0.05 mm to 0.25 mm, so that the ESL can be effectively reduced.

Second Embodiment

Figure 18:
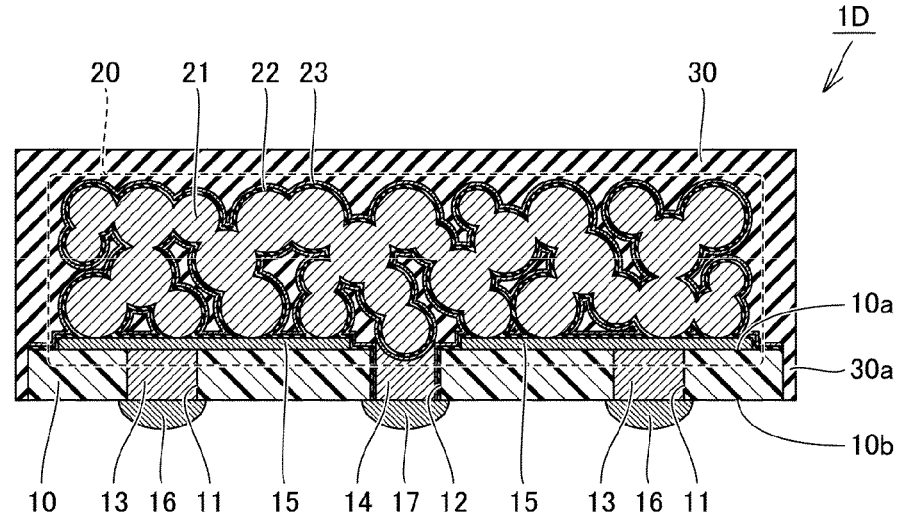
FIG. 18 is a schematic sectional view of the capacitor according to a second embodiment.

FIG. 18 is a schematic sectional view of the capacitor according to a second embodiment. Hereinafter, a capacitor 1D according to the present embodiment will be described with reference to FIG. 18.

As illustrated in FIG. 18, the capacitor 1D according to the present embodiment is different from the capacitor 1A according to the first embodiment described above in a configuration of the sealing portion 30, and specifically, the sealing portion 30 has an end surface covering portion 30a that covers an end surface of the insulating substrate 10. In order to achieve the configuration, since the end surface of the insulating substrate 10 needs to be exposed in advance at the time of forming the sealing portion 30, the sealing portion 30 may be formed after the above-described grinding processing and singulation are performed.

In such a configuration, not only an effect described in the first embodiment described above can be obtained, but also an entry path of moisture is extended by the end surface of the insulating substrate 10 being covered by the sealing portion 30, so that the moisture resistance can be further improved. In addition, since the insulating substrate 10 is protected by the sealing portion 30, it is also possible to prevent the insulating substrate 10 from being damaged by chipping or the like in advance.

Third Embodiment

Figure 19:
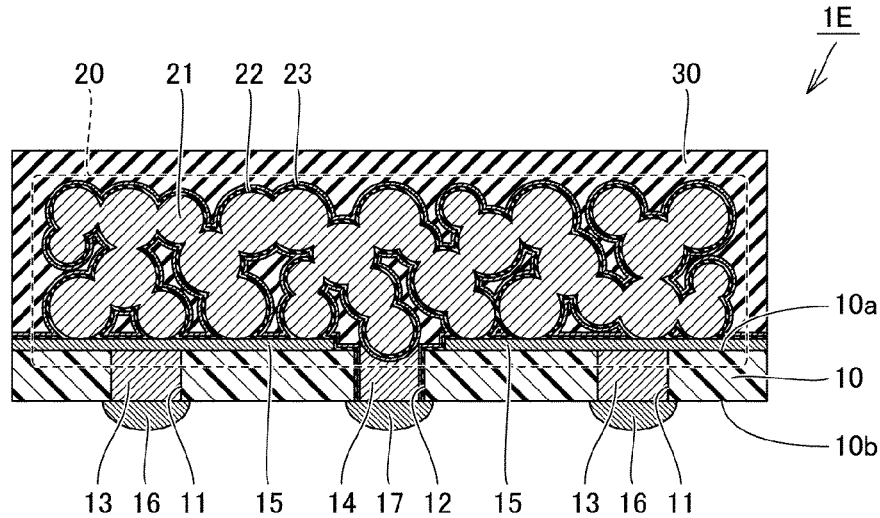
FIG. 19 is a schematic sectional view of the capacitor according to a third embodiment.

FIG. 19 is a schematic sectional view of the capacitor according to a third embodiment. Hereinafter, a capacitor 1E according to the present embodiment will be described with reference to FIG. 19.

As illustrated in FIG. 19, in the capacitor 1E according to the present embodiment, the size of the connection conductor 15 provided on the first main surface 10a of the insulating substrate 10 is different from that of the capacitor 1A according to the first embodiment described above, and the connection conductor 15 is configured to be larger than that of the capacitor 1A. Specifically, the connection conductor 15 extends further outward than in the first embodiment, thereby reaching a peripheral edge of the insulating substrate 10.

Even in such a configuration, it is possible to obtain an effect substantially similar to the effect described in the first embodiment described above.

Fourth Embodiment

Figure 20:
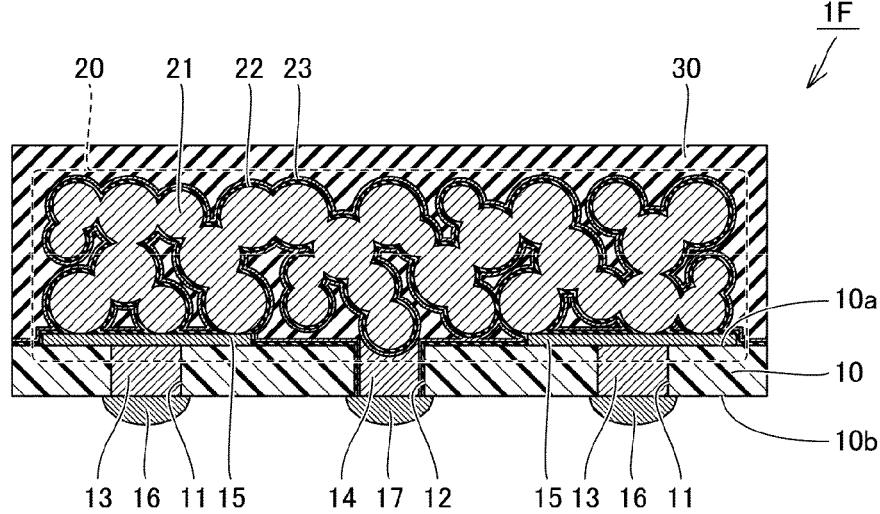
FIG. 20 is a schematic sectional view of the capacitor according to a fourth embodiment.
Figure 21:
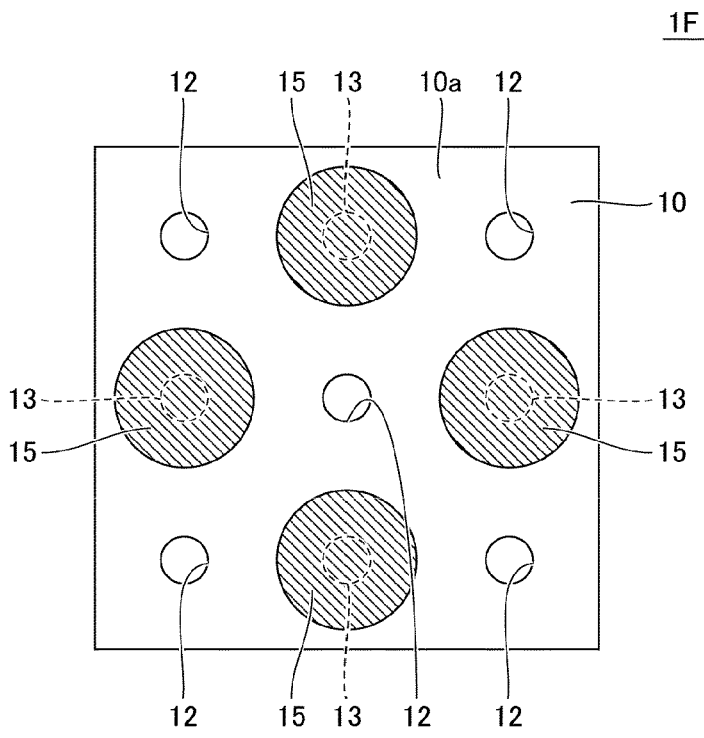
FIG. 21 is a schematic plan view of the insulating substrate as one component before assembling the capacitor illustrated in FIG. 20.

FIG. 20 is a schematic sectional view of the capacitor according to a fourth embodiment, and FIG. 21 is a schematic plan view of the insulating substrate as one component before the capacitor is assembled. Hereinafter, a capacitor 1F according to the present embodiment will be described with reference to FIGS. 20 and 21. Note that in FIG. 21, the connection conductor 15 is hatched for easy understanding.

As illustrated in FIGS. 20 and 21, in the capacitor 1F according to the present embodiment, the size of the connection conductor 15 provided on the first main surface 10a of the insulating substrate 10 is different from that of the capacitor 1A according to the first embodiment described above, and the connection conductor 15 is configured to be smaller than that of the capacitor 1A. Specifically, the connection conductor 15 is not made of a single land-like conductive layer, and four connection conductors are respectively provided in an island shape corresponding to four first via conductors 13.

Here, each of the four connection conductors 15 is configured to be larger than each of the corresponding first via conductors 13. Thus, the surface of the first via conductor 13 located on the first main surface 10a side of the insulating substrate 10 is covered with the connection conductor 15, and the metal porous body 21 of the capacitance forming portion 20 is bonded to the connection conductor 15 (see FIG. 20).

In such a configuration, although the size of the connection conductor 15 is smaller than that of the capacitor 1A according to the above-described first embodiment, it is possible to obtain the effect substantially similar to the effect described in the first embodiment described above.

Fifth Embodiment

Figure 22:
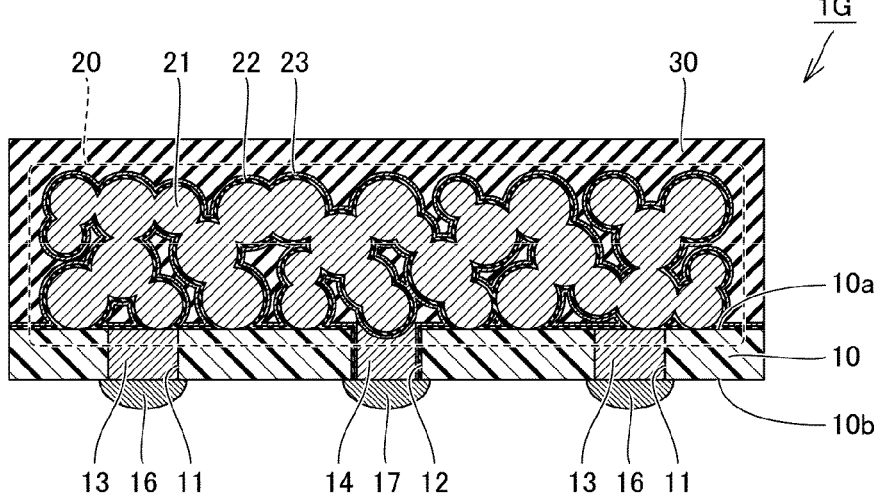
FIG. 22 is a schematic sectional view of the capacitor according to a fifth embodiment.
Figure 23:
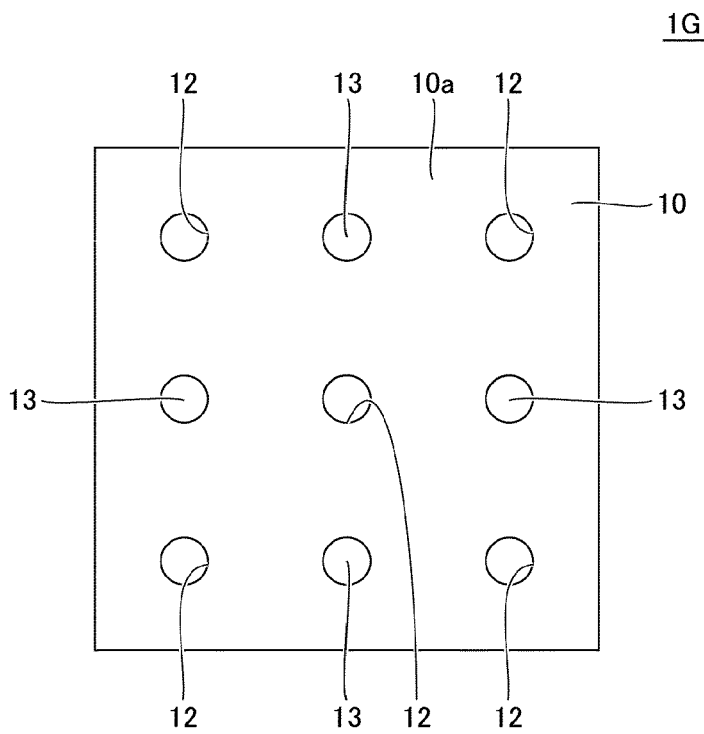
FIG. 23 is a schematic plan view of the insulating substrate as one component before assembling the capacitor illustrated in FIG. 22.

FIG. 22 is a schematic sectional view of the capacitor according to a fifth embodiment, and FIG. 23 is a schematic plan view of the insulating substrate as one component before the capacitor is assembled. Hereinafter, a capacitor 1G according to the present embodiment will be described with reference to FIGS. 22 and 23.

As illustrated in FIGS. 22 and 23, the capacitor 1G according to the present embodiment is different from the capacitor 1A according to the above-described first embodiment in that the connection conductor 15 is not provided on the first main surface 10a of the insulating substrate 10. Specifically, on the first main surface of the insulating substrate 10, the end portion of the first via conductor 13 is located to be exposed, and the metal porous body 21 of the capacitance forming portion 20 is bonded to a part of the exposed end portion of the first via conductor 13 (see FIG. 22). Note that a remaining portion of the exposed end portion of the first via conductor 13 is covered with the dielectric film 22 (see FIG. 22).

In such a configuration, not only the effect described in the first embodiment described above can be obtained, but also warpage of the insulating substrate 10 is difficult to occur because the conductive layer as the connection conductor 15 is not formed on the first main surface 10a of the insulating substrate 10. Therefore, it is not necessary to form the sealing portion 30 thick in order to suppress the occurrence of warpage, so that miniaturization and high capacity can be achieved also in that sense.

Sixth Embodiment

Figure 24:
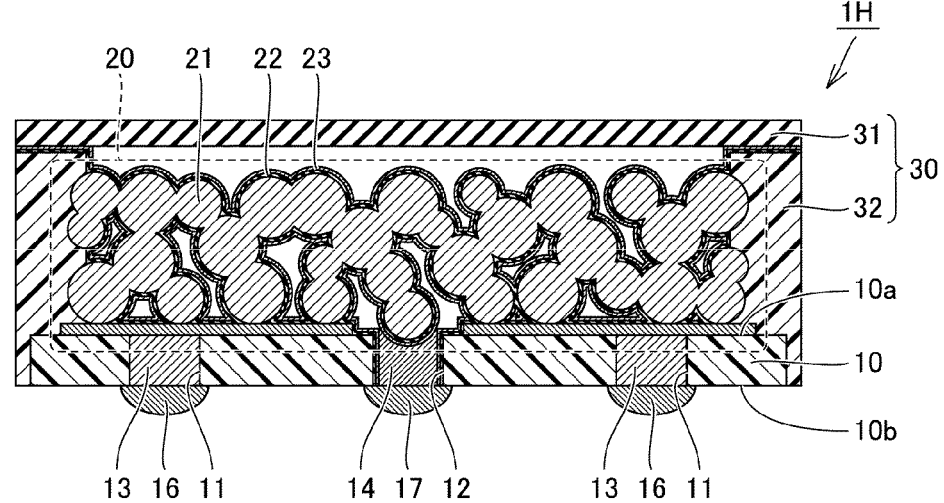
FIG. 24 is a schematic sectional view of the capacitor according to a sixth embodiment.

FIG. 24 is a schematic sectional view of the capacitor according to a sixth embodiment. Hereinafter, a capacitor 1H according to the present embodiment will be described with reference to FIG. 24.

As illustrated in FIG. 24, the capacitor 1H according to the present embodiment is different from the capacitor 1A according to the above-described first embodiment in the configuration of the sealing portion 30. Specifically, in the capacitor 1H according to the present embodiment, the sealing portion 30 includes an upper sealing portion 31 located on a side opposite to a side on which the insulating substrate 10 is located when viewed from the capacitance forming portion 20, and a side sealing portion 32 located to surround the capacitance forming portion 20 between the insulating substrate 10 and the upper sealing portion 31.

Here, the upper sealing portion 31 is made of an insulating resin material. Specifically, a material of the upper sealing portion 31 can be, for example, the resin material such as the polyimide resin, the polybenzoxazole resin, the polyethylene terephthalate resin, the benzocyclobutene resin, or the epoxy resin. In addition, the resin material can contain various additives, and for example, Si filler, $Al_2O_3$ filler, or the like may be contained in order to adjust the thermal expansion coefficient.

On the other hand, the side sealing portion 32 is made of a glass material. The side sealing portion 32 is provided to cover a side end portion of the capacitance forming portion 20, and is formed by applying the conductive paste to be the metal porous body 21 to the insulating substrate 10, then subsequently applying the glass material so as to cover a periphery of the insulating substrate 10, and co-sintering the glass material together with the conductive paste. Note that thereafter the dielectric film 22 and the conductive film 23 are formed.

In such a configuration, not only the effect described in the first embodiment described above can be obtained, but also most of the sealing portion 30 can be made of the glass material instead of the resin material, so that the occurrence of warpage in the capacitor can be suppressed while securing the moisture resistance. Therefore, mounting stability is increased, and occurrence of a connection failure or the like with the wiring substrate or the like over time can be suppressed. Furthermore, since the capacitance forming portion 20 is covered with the glass material, it is also possible to obtain a secondary effect that occurrence of electric field concentration can be suppressed.

Seventh Embodiment

Figure 25:
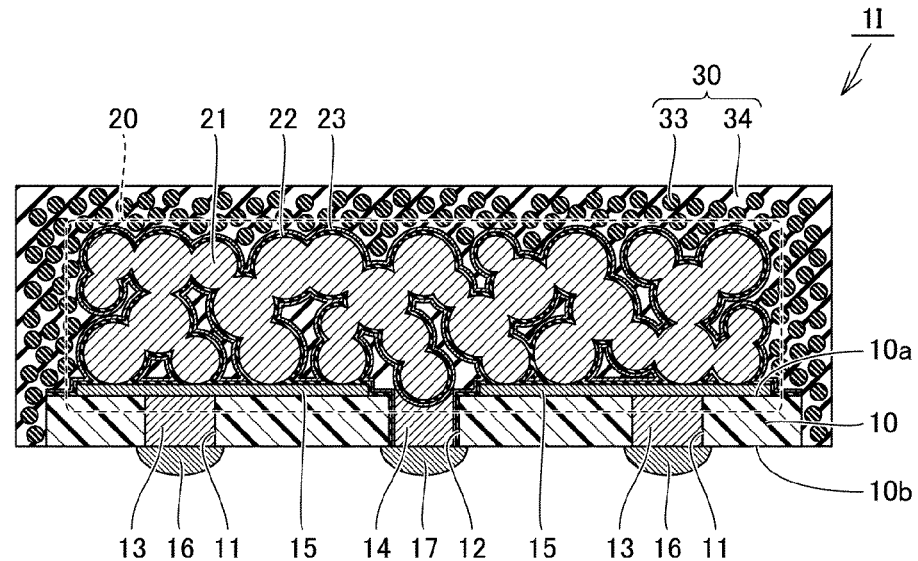
FIG. 25 is a schematic sectional view of the capacitor according to a seventh embodiment.

FIG. 25 is a schematic sectional view of the capacitor according to a seventh embodiment. Hereinafter, a capacitor 1I according to the present embodiment will be described with reference to FIG. 25.

As illustrated in FIG. 25, the capacitor 1I according to the present embodiment is different from the capacitor 1A according to the above-described first embodiment in the configuration of the sealing portion 30. Specifically, in the capacitor 1I according to the present embodiment, the sealing portion 30 includes an insulating inorganic particle 33 and an inorganic film 34 that seals the capacitance forming portion 20 while covering the inorganic particle 33.

Here, the inorganic particle 33 is made of, for example, powder such as $Al_2O_3$, and is formed, for example, by being applied to the capacitance forming portion 20 as a ceramic slurry containing the inorganic particle 33 after formation of the capacitance forming portion 20, and then the ceramic slurry being fired. On the other hand, the inorganic film 34 is made of, for example, a $SiO_2$ film or the like, and is formed, for example, by the CVD method or the like after the inorganic particle 33 is attached to the capacitance forming portion 20 and fired.

In such a configuration, not only the effect described in the first embodiment described above can be obtained, but also the sealing portion 30 can be made of the inorganic material instead of the resin material, so that the occurrence of warpage in the capacitor can be suppressed while securing the moisture resistance. Therefore, mounting stability is increased, and occurrence of a connection failure or the like with the wiring substrate or the like over time can be suppressed. Furthermore, since the capacitance forming portion 20 is covered with the inorganic material, it is also possible to obtain the secondary effect that the occurrence of the electric field concentration can be suppressed.

Eighth Embodiment

Figure 26:
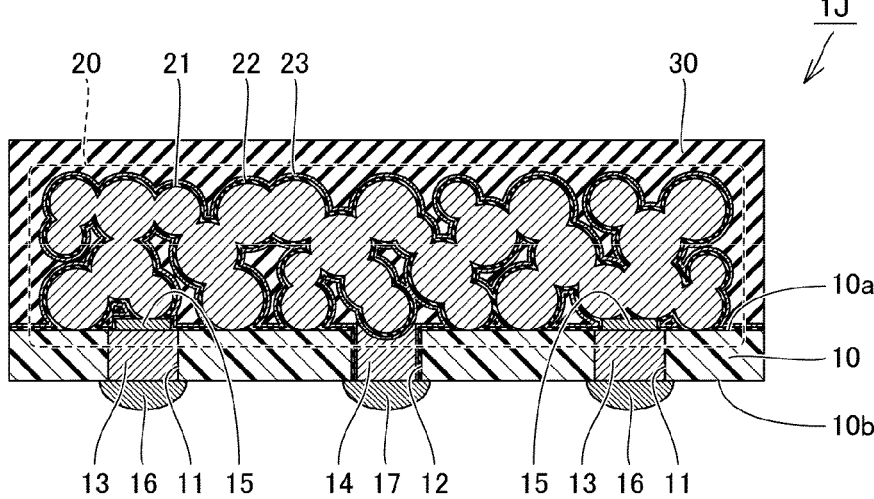
FIG. 26 is a schematic sectional view of the capacitor according to an eighth embodiment.
Figure 27:
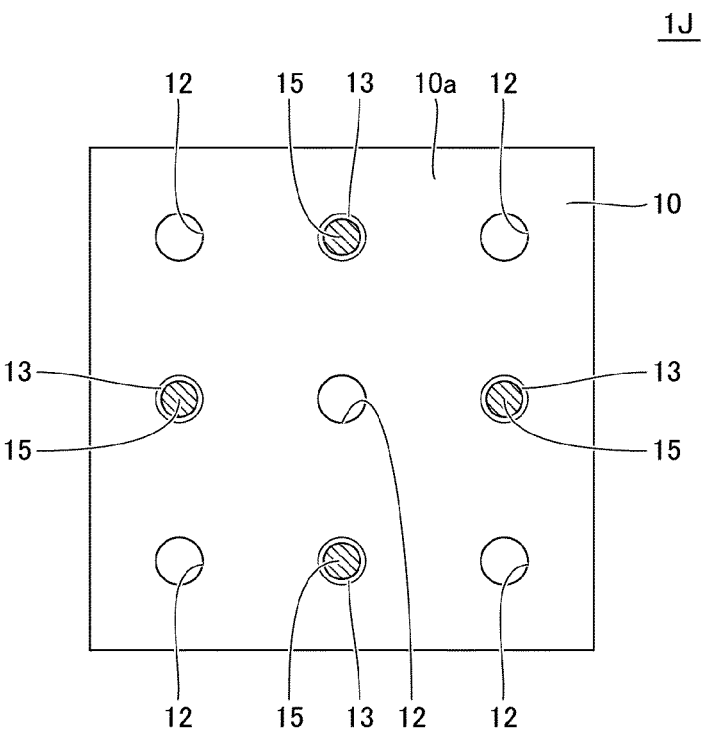
FIG. 27 is a schematic plan view of the insulating substrate as one component before assembling the capacitor illustrated in FIG. 26.

FIG. 26 is a schematic sectional view of the capacitor according to an eighth embodiment, and FIG. 27 is a schematic plan view of the insulating substrate as one component before the capacitor is assembled. Hereinafter, a capacitor 1J according to the present embodiment will be described with reference to FIG. 26. Note that in FIG. 27, the connection conductor 15 is hatched for easy understanding.

As illustrated in FIGS. 26 and 27, in the capacitor 1J according to the present embodiment, the size of the connection conductor 15 provided on the first main surface 10a of the insulating substrate 10 is different from that of the capacitor 1A according to the first embodiment described above, and the connection conductor 15 is configured to be smaller than that of the capacitor 1A. Specifically, the connection conductor 15 is not made of a single land-like conductive layer, and four connection conductors are respectively provided in an island shape corresponding to four first via conductors 13.

Here, each of the four connection conductors 15 is configured to be smaller than each of the corresponding first via conductors 13. Thus, a part of the surface of the first via conductor 13 located on the first main surface 10a side of the insulating substrate 10 is covered with the connection conductor 15, and the metal porous body 21 of the capacitance forming portion 20 is bonded to the connection conductor 15

(see FIG. 26). Note that a remaining portion of the first via conductor 13 located on the first main surface 10a side of the insulating substrate 10 is covered with the dielectric film 22 (see FIG. 26).

In such a configuration, although the size of the connection conductor 15 is smaller than that of the capacitor 1A according to the above-described first embodiment, it is possible to obtain the effect substantially similar to the effect described in the first embodiment described above. Furthermore, since the conductive layer as the connection conductor 15 is not formed on the first main surface 10a of the insulating substrate 10, the insulating substrate 10 is less likely to warp. Therefore, it is not necessary to form the sealing portion 30 thick in order to suppress the occurrence of warpage, so that miniaturization and high capacity can be achieved also in that sense.

Note that in the present embodiment, a case where the connection conductor 15 is configured to be smaller than the corresponding first via conductor 13 has been exemplified, but the connection conductor 15 may have the same size as the corresponding first via conductor 13. Also in this case, the occurrence of warpage in the insulating substrate 10 can be suppressed.

Ninth Embodiment

Figure 28:
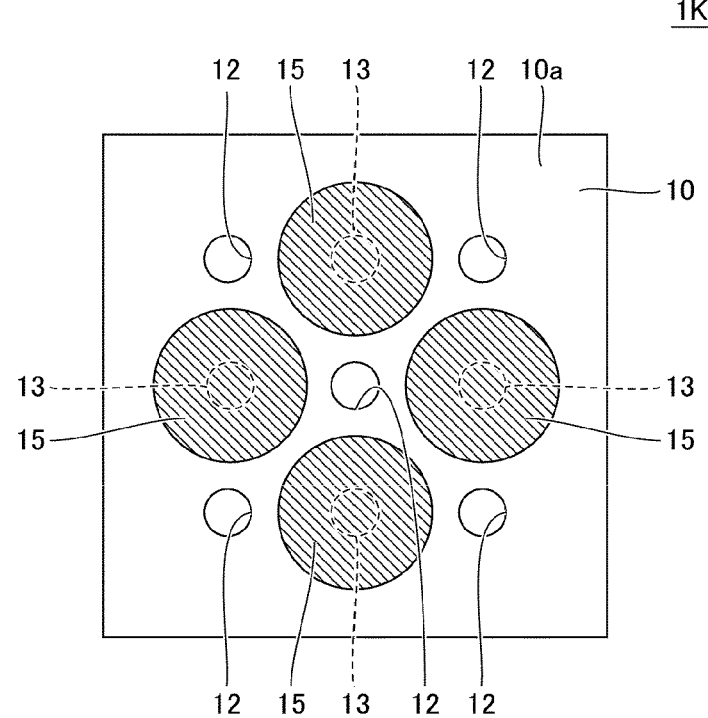
FIG. 28 is a schematic plan view of the insulating substrate as one component before assembling the capacitor according to a ninth embodiment.

FIG. 28 is a schematic plan view of the insulating substrate as one component before assembling the capacitor according to a ninth embodiment. Hereinafter, a capacitor 1K according to the present embodiment will be described with reference to FIG. 28. Note that in FIG. 28, the connection conductor 15 is hatched for easy understanding.

As illustrated in FIG. 28, in the capacitor 1K according to the present embodiment, the size of the connection conductor 15 provided on the first main surface 10a of the insulating substrate 10 is different from that of the capacitor 1A according to the first embodiment described above, and the connection conductor 15 is configured to be smaller than that of the capacitor 1A. Specifically, the connection conductor 15 is not made of a single land-like conductive layer, and four connection conductors are respectively provided in an island shape corresponding to four first via conductors 13.

Here, each of the four connection conductors 15 is configured to be larger than each of the corresponding first via conductors 13. Thus, the surface of the first via conductor 13 located on the first main surface 10a side of the insulating substrate 10 is covered with the connection conductor 15, and the metal porous body 21 of the capacitance forming portion 20 is bonded to the connection conductor 15.

Furthermore, the connection conductor 15 is formed between the first via conductor 13 covered by the connection conductor 15 and the second via conductor 14 disposed at a position closest to the first via conductor 13, so as to extend to the second via conductor 14 side from an intermediate position of a line connecting adjacent ends of the first via conductor 13 and the second via conductor 14.

In such a configuration, although the size of the connection conductor 15 is smaller than that of the capacitor 1A according to the above-described first embodiment, it is possible to obtain the effect substantially similar to the effect described in the first embodiment described above. In particular, by adopting the above configuration, since the size of the connection conductor 15 connecting the metal porous body 21 and the first via conductor 13 can be sufficiently secured, the close contact strength between the insulating substrate 10 and the connection conductor 15 and the close contact strength between the connection conductor 15 and the metal porous body 21 can be increased, so that the moisture resistance is improved, and the capacitor in which cracks and the like are difficult to occur can be obtained.

Tenth Embodiment

Figure 29:
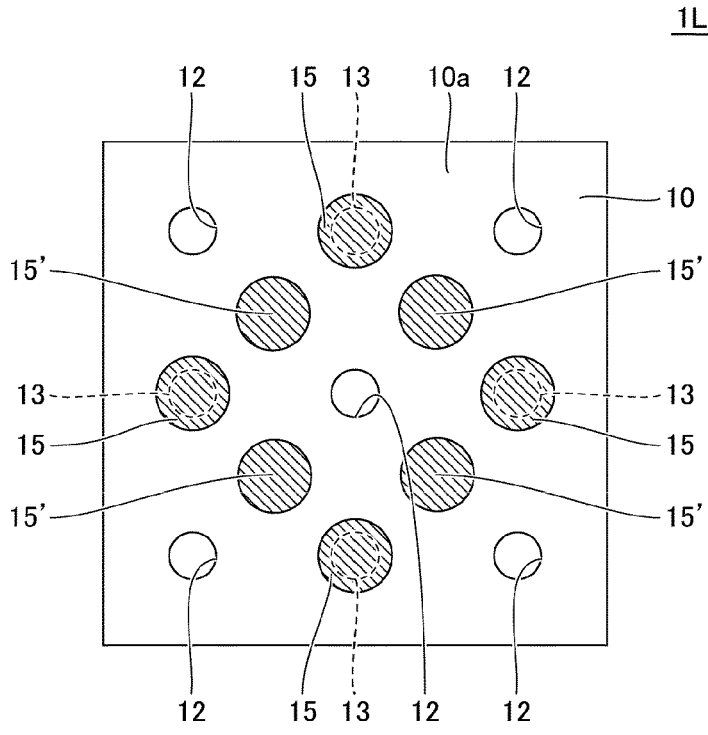
FIG. 29 is a schematic plan view of the insulating substrate as one component before assembling the capacitor according to a tenth embodiment.

FIG. 29 is a schematic plan view of the insulating substrate as one component before assembling the capacitor according to a tenth embodiment. Hereinafter, a capacitor 1L according to the present embodiment will be described with reference to FIG. 29. Note that in FIG. 29, the connection conductor 15 and an auxiliary connection conductor 15' to be described later are hatched for easy understanding.

As illustrated in FIG. 29, in the capacitor 1L according to the present embodiment, the size of the connection conductor 15 provided on the first main surface 10a of the insulating substrate 10 is different from that of the capacitor 1A according to the first embodiment described above, the connection conductor 15 is configured to be smaller than that of the capacitor 1A, and a plurality of auxiliary connection conductors 15' are provided on the first main surface 10a of the insulating substrate 10. Specifically, the connection conductor 15 is not made of a single land-like conductive layer, four connection conductors are respectively provided in an island shape corresponding to four first via conductors 13, and four auxiliary connection conductors 15' are provided in an island shape.

Here, each of the four connection conductors 15 is configured to be larger than each of the corresponding first via conductors 13. Thus, the surface of the first via conductor 13 located on the first main surface 10a side of the insulating substrate 10 is covered with the connection conductor 15, and the metal porous body 21 of the capacitance forming portion 20 is bonded to the connection conductor 15.

On the other hand, each of the four auxiliary connection conductors 15' is provided on the first main surface 10a of the insulating substrate 10 in a portion where neither the first via conductor 13 nor the second via conductor 14 is located, and thus is not directly electrically connected to the first via conductor 13. However, since the auxiliary connection conductor 15' is located on the first main surface 10a of the insulating substrate 10, the metal porous body 21 of the capacitance forming portion 20 is bonded to the auxiliary connection conductor 15'.

In such a configuration, although the size of the connection conductor 15 is smaller than that of the capacitor 1A according to the above-described first embodiment, it is possible to obtain the effect substantially similar to the effect described in the first embodiment described above. Furthermore, by providing a plurality of auxiliary connection conductors 15' provided on the first main surface 10a of the insulating substrate 10, the metal porous body 21 and the insulating substrate 10 are bonded to each other with the auxiliary connection conductors interposed therebetween, so that a bonding area between the insulating substrate 10 and the metal porous body 21 is increased. Therefore, the close contact strength between the insulating substrate 10 and the metal porous body 21 can be increased, and as a result, the moisture resistance is improved, and the capacitor in which the cracks and the like are difficult to occur can be obtained.

Eleventh Embodiment

Figure 30:
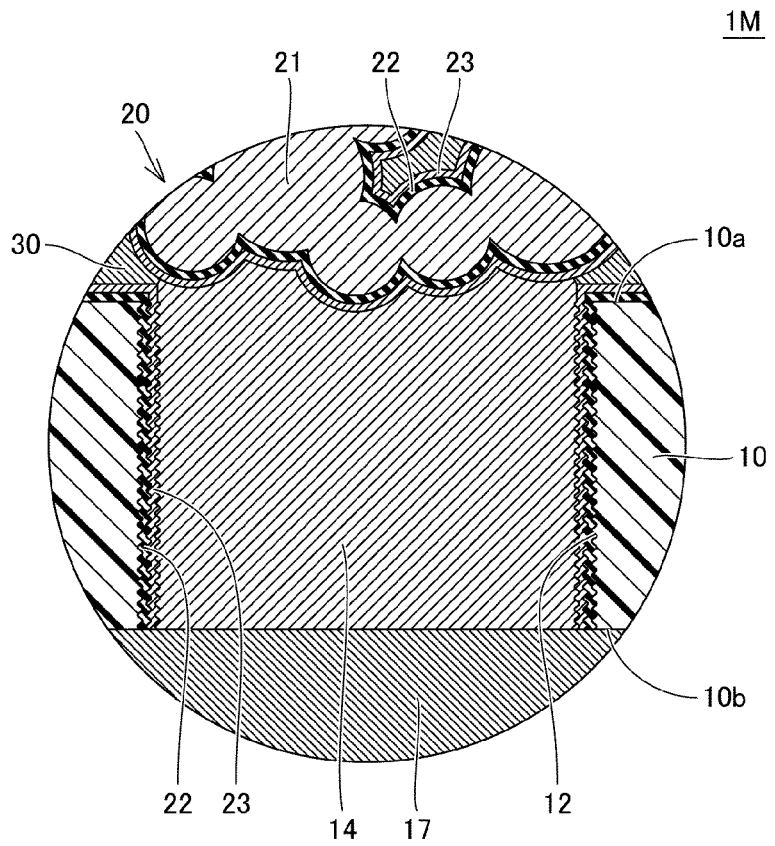
FIG. 30 is an enlarged schematic sectional view of the vicinity of the second via conductor of the capacitor according to an eleventh embodiment.

FIG. 30 is an enlarged schematic sectional view of the vicinity of the second via conductor of the capacitor according to an eleventh embodiment. Hereinafter, a capacitor 1M according to the present embodiment will be described with reference to FIG. 30.

As illustrated in FIG. 30, the capacitor 1M according to the present embodiment is different from the capacitor 1A according to the above-described first embodiment in a configuration in the vicinity of the second via conductor 14. Specifically, in the capacitor 1M according to the present embodiment, a wall surface of the portion defining the second through-hole 12 of the insulating substrate 10 is subjected to a roughening treatment, and thus the wall surface of the portion has fine irregularities, and fine irregularities are also formed on a surface of each of the dielectric film 22, the conductive film 23, and the second via conductor 14 in a portion covering the wall surface of the portion.

In such a configuration, not only an effect similar to the effect described in the first embodiment described above can be obtained, but also a so-called anchor effect can be obtained, and the close contact strength between the substrate of the insulating substrate 10 and the dielectric film 22, close contact strength between the dielectric film 22 and the conductive film 23, and close contact strength between the conductive film 23 and the second via conductor 14 are increased. Therefore, the moisture resistance is improved by increasing the close contact strength, and the moisture resistance is improved by extending the entry path of moisture by an amount of fine irregularities formed in the portion. Furthermore, the close contact strength is increased, so that the capacitor in which the cracks and the like are difficult to occur can be obtained.

Note that from the above viewpoint, a surface roughness of the wall surface of the portion defining the second through-hole 12 of the insulating substrate 10 is preferably 20 nm to 500 nm. Here, as a method for forming the insulating substrate 10 having the surface roughness, for example, sand blasting or the like can be employed.

Here, from the viewpoint of enhancing the anchor effect described above, it is preferred that the conductive film 23 is made of a crystalline film, or a deposited film having a columnar structure including fine columnar bodies grown in a direction substantially perpendicular to the surface of the dielectric film 22. Since these films have a dense structure, they easily enter the fine irregularities formed on the surface of the dielectric film 22 at the time of formation thereof, and thus a high anchor effect can be obtained.

From the viewpoint of reducing the ESR, the conductive film 23 preferably has a high conductivity.

When these viewpoints are taken into consideration, the conductive film 23 is preferably made of a film containing at least one of the metal nitrides such as TiN and WN, and the metal oxides such as $RuO_2$, ZnO, $(Zn_xAl_{1-x})O$, and NiO.

Twelfth Embodiment

Figure 31:
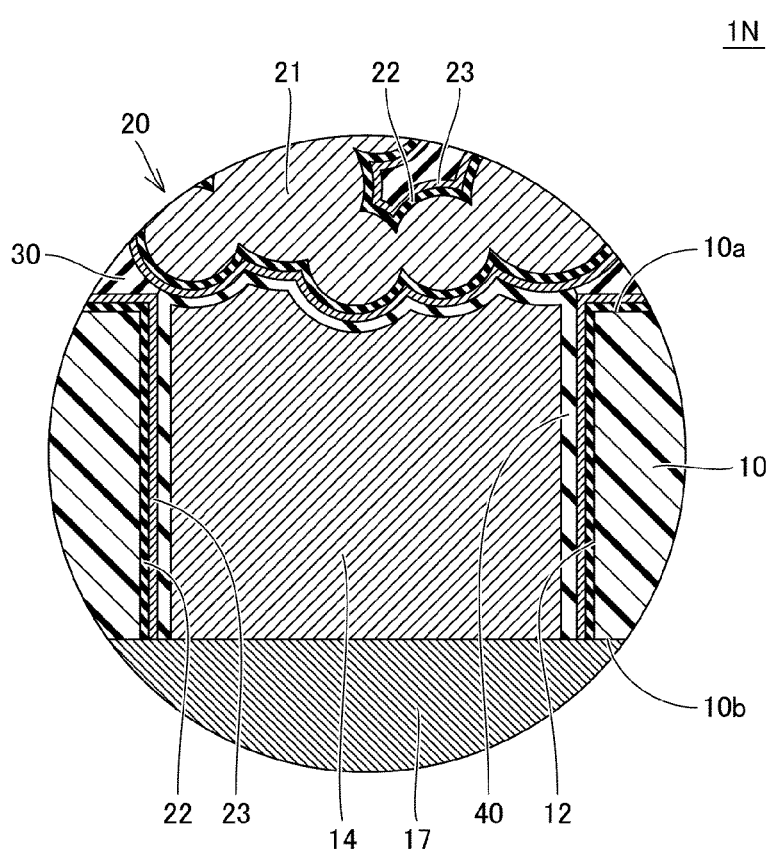
FIG. 31 is an enlarged schematic sectional view of the vicinity of the second via conductor of the capacitor according to a twelfth embodiment.

FIG. 31 is an enlarged schematic sectional view of the vicinity of the second via conductor of the capacitor according to a twelfth embodiment. Hereinafter, a capacitor 1N according to the present embodiment will be described with reference to FIG. 31.

As illustrated in FIG. 31, the capacitor 1N according to the present embodiment is different from the capacitor 1A according to the above-described first embodiment in the configuration in the vicinity of the second via conductor 14. Specifically, in the capacitor 1N according to the present embodiment, a close contact layer 40 is provided between the conductive film 23 and the second via conductor 14. The close contact layer 40 is for improving close contact between the conductive film 23 and the second via conductor 14.

More specifically, the close contact layer 40 includes a portion located at the boundary portion between the second via conductor 14 and the substrate of the insulating substrate 10 and a portion located at a boundary portion between the second via conductor 14 and the capacitance forming portion 20, the portion located at the boundary portion between the second via conductor 14 and the substrate of the insulating substrate 10 covers the conductive film 23 of a portion located to cover the substrate of the insulating substrate 10, and the portion located at the boundary portion between the second via conductor 14 and the capacitance forming portion 20 covers the conductive film 23 of a portion located to cover the metal porous body 21.

In such a configuration, not only the effect similar to the effect described in the first embodiment described above can be obtained, but also an effect that the close contact strength between the conductive film 23 and the second via conductor 14 is increased by the close contact layer 40 located therebetween can be obtained, and as a result, the moisture resistance can be improved, and the capacitor in which cracks and the like are difficult to occur can be obtained.

Note that the material of the close contact layer 40 is not particularly limited as long as the close contact layer has conductivity and high close contact to both the conductive film 23 and the second via conductor 14, but the close contact layer is preferably made of a film containing as a main material any one of Ag, Ni, Cu, and the conductive polymer. Here, the close contact layer 40 can be formed by the inkjet method, the screen printing method, a physical vapor deposition (PVD) method, the CVD method, an electroless plating method, or the like after formation of the conductive film 23 and before formation of the second via conductor 14.

Thirteenth Embodiment

Figure 32:
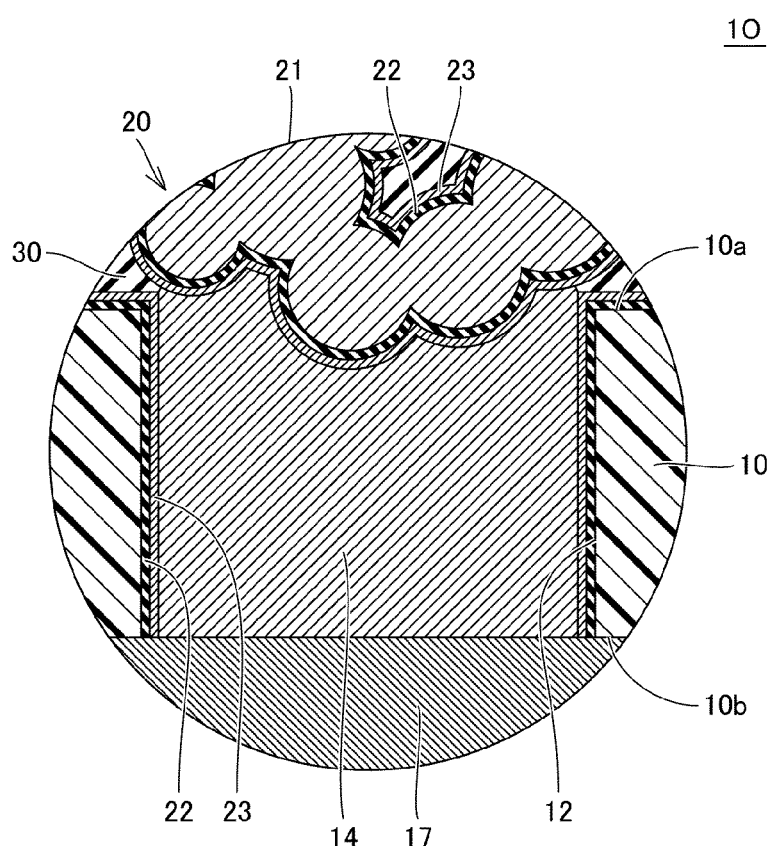
FIG. 32 is an enlarged schematic sectional view of the vicinity of the second via conductor of the capacitor according to a thirteenth embodiment.

FIG. 32 is an enlarged schematic sectional view of the vicinity of the second via conductor of the capacitor according to a thirteenth embodiment. Hereinafter, a capacitor 1O according to the present embodiment will be described with reference to FIG. 32.

As illustrated in FIG. 32, the capacitor 1O according to the present embodiment is different from the capacitor 1A according to the above-described first embodiment in the configuration in the vicinity of the second via conductor 14. Specifically, in the capacitor 1O according to the present embodiment, a part of the metal porous body 21 further enters the second via conductor 14 in a portion penetrating the insulating substrate 10 (that is, the part of the metal porous body 21 is located deeper in the second through-hole 12 of the insulating substrate 10).

In such a configuration, not only the effect similar to the effect described in the first embodiment described above can be obtained, but also an effect of increasing capacitance of the capacitance forming portion 20 by the capacitance forming portion 20 including the metal porous body 21 being positioned in the second through-hole 12 of the insulating substrate 10 can be obtained. Furthermore, since the end portion of the second via conductor 14 on the first main surface 10a side is disposed closer to the second main surface 10b side than the first main surface 10a of the insulating substrate 10, it is possible to reduce occurrence of residues that may occur when the second via conductor 14 is formed, and it is also possible to reduce the ESR.

Fourteenth Embodiment

Figure 33:
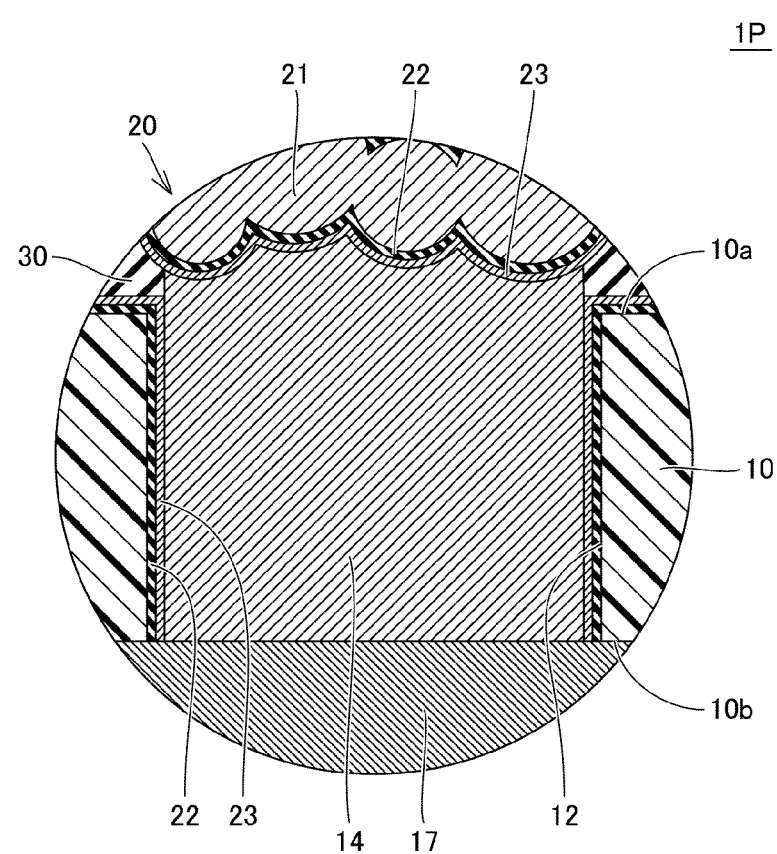
FIG. 33 is an enlarged schematic sectional view of the vicinity of the second via conductor of the capacitor according to a fourteenth embodiment.

FIG. 33 is an enlarged schematic sectional view of the vicinity of the second via conductor of the capacitor according to a fourteenth embodiment. Hereinafter, a capacitor 1P according to the present embodiment will be described with reference to FIG. 33.

As illustrated in FIG. 33, the capacitor 1P according to the present embodiment is different from the capacitor 1A according to the above-described first embodiment in the configuration in the vicinity of the second via conductor 14. Specifically, in the capacitor 1P according to the present embodiment, the metal porous body 21 does not enter the second via conductor 14 in the portion penetrating the insulating substrate 10 (that is, the metal porous body 21 is not located in the second through-hole 12 of the insulating substrate 10).

In such a configuration, not only the effect similar to the effect described in the first embodiment described above can be obtained, but also the capacitor in which the cracks and the like are difficult to occur can be obtained. That is, by making the metal porous body 21 not enter the second via conductor 14 in the portion penetrating the insulating substrate 10, the capacitance forming portion 20 does not come into direct contact with the conductive film 23 in a portion covering the insulating substrate 10, so that also when stress is applied to the insulating substrate 10, influence of the stress on the capacitance forming portion 20 can be reduced, and as a result, the capacitor in which the cracks and the like are difficult to occur can be obtained.

Note that in order to ensure a state in which the metal porous body 21 does not enter the second via conductor 14 in the portion penetrating the insulating substrate 10 as described above, for example, the metal porous body 21 in a portion located in the second through-hole 12 of the insulating substrate 10 and in the vicinity thereof may be irradiated with a laser to remove the metal porous body 21 in the portion after formation of the metal porous body 21 and before the formation of the dielectric film 22.

Fifteenth Embodiment

Figure 34:
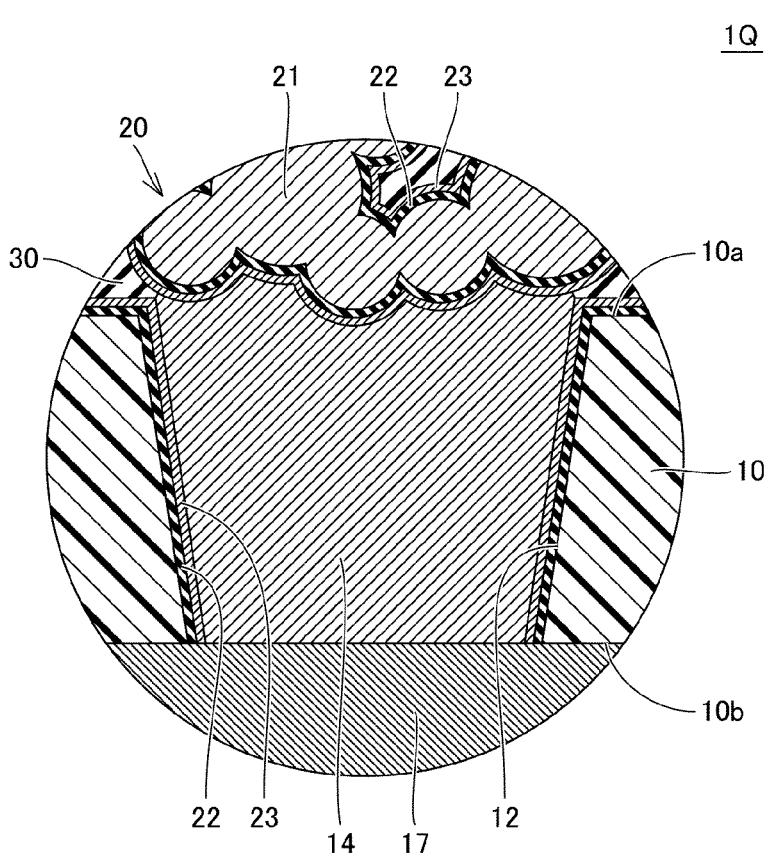
FIG. 34 is an enlarged schematic sectional view of the vicinity of the second via conductor of the capacitor according to a fifteenth embodiment.

FIG. 34 is an enlarged schematic sectional view of the vicinity of the second via conductor of the capacitor according to a fifteenth embodiment. Hereinafter, a capacitor 1Q according to the present embodiment will be described with reference to FIG. 34.

As illustrated in FIG. 34, the capacitor 1Q according to the present embodiment is different from the capacitor 1A according to the above-described first embodiment in the configuration in the vicinity of the second via conductor 14. Specifically, in the capacitor 1Q according to the present embodiment, the second through-hole 12 of the insulating substrate 10 has a tapered shape in which a cavity shape decreases from the first main surface 10a side toward the second main surface 10b side, and accordingly, the second via conductor 14 has a tapered shape in which a sectional shape decreases from the first main surface 10a side toward the second main surface 10b side. More specifically, in the capacitor 1Q according to the present embodiment, the second via conductor 14 has a substantially truncated cone shape in which an exposed area on the first main surface 10a side is larger than that on the second main surface 10b side.

In such a configuration, not only the effect similar to the effect described in the first embodiment described above can be obtained, but also the capacitor in which the cracks and the like are difficult to occur can be obtained. That is, since the second via conductor 14 has the tapered shape in which the sectional shape decreases from the first main surface 10a side toward the second main surface 10b side, the capacitance forming portion 20 is difficult to come into direct contact with the conductive film 23 in the portion covering the insulating substrate 10, so that also when the stress is applied to the insulating substrate 10, the influence of the stress on the capacitance forming portion 20 can be reduced, and as a result, the capacitor in which the cracks and the like are difficult to occur can be obtained.

Further, in such a configuration, it is possible to reduce the ESR and to produce a capacitor in which the metal porous body 21 is less likely to warp. That is, as the exposed area of the second via conductor 14 on the first main surface 10a side increases, a contact area between the capacitance forming portion 20 and the second via conductor 14 increases, and accordingly, the ESR is reduced, the bondability between the capacitance forming portion 20 and the insulating substrate 10 is improved, and it is possible to suppress the warpage that may occur in the metal porous body 21.

Furthermore, in such a configuration, as compared with the case where the second via conductor 14 has a substantially columnar shape, the entry path of moisture is extended by the second via conductor 14 having a substantially truncated cone shape, and accordingly, the moisture resistance is improved.

The embodiments disclosed herein are illustrative in all respects and are not restrictive. The technical scope of the present invention is defined by the claims, and includes all modifications within the meaning and scope equivalent to the description of the claims.

DESCRIPTION OF REFERENCE SYMBOLS

1A to 1Q, 1A1 to 1A3, 1B1 to 1B4: Capacitor
10: Insulating substrate
10a: First main surface
10b: Second main surface
11: First through-hole
12: Second through-hole
13: First via conductor
14: Second via conductor
15: Connection conductor
15': Auxiliary connection conductor
16: First bump
17: Second bump
20: Capacitance forming portion
21: Metal porous body
22: Dielectric film
23: Conductive film
30: Sealing portion
30a: End surface covering portion
31: Upper sealing portion
32: Side sealing portion
33: Inorganic particle
34: Inorganic film
40: Close contact layer

The invention claimed is:

1. A capacitor comprising:

an insulating substrate having a first main surface and a second main surface opposed to the first main surface, the insulating substrate containing an inorganic oxide as a main material thereof;

a capacitance forming portion on the first main surface, the capacitance forming portion including a conductive metal porous body, a dielectric film covering a surface of the metal porous body, and a conductive film covering the dielectric film;

a sealing portion on the first main surface and positioned so as to seal the capacitance forming portion together with the insulating substrate;

a first external connection line connected to the conductive metal porous body of the capacitance forming portion, the first external connection line including a first via conductor penetrating the insulating substrate so as to reach the second main surface from the first main surface; and a second external connection line connected to the conductive film of the capacitance forming portion, the second external connection line including a second via conductor penetrating the insulating substrate so as to reach the second main surface from the first main surface, wherein the first via conductor and the second via conductor are both located in a region where the capacitance forming portion is disposed when viewed in a normal direction of the first main surface, and wherein, at a boundary portion between the second via conductor and the insulating substrate, the insulating substrate is covered with the dielectric film, the dielectric film is covered with the conductive film, and the conductive film is covered with the second via conductor.

2. The capacitor according to claim 1, wherein the conductive film is a deposited film having a columnar structure including a columnar body grown in a direction substantially perpendicular to a surface of the dielectric film.

3. The capacitor according to claim 1, further comprising a close contact layer between the conductive film and the second via conductor.

4. The capacitor according to claim 1, wherein a surface roughness of the insulating substrate in a portion covered with the second via conductor is 200 nm to 20 μm.

5. The capacitor according to claim 1, wherein the inorganic oxide of the insulating substrate is at least one of $Al_2O_3$, MgO, $Mg_2SiO_4$, $BaTiO_3$, $SrTiO_3$, and $CaTiO_3$, the dielectric film contains at least one of $AlO_x$, $SiO_x$, $HfO_x$, and $ZrO_x$, the conductive film contains at least one of TIN, WN, $RuO_2$, ZnO, $(Zn_xAl_{1-x})$ O, and NiO, and the second via conductor contains at least one of Cu, Ni, Ag, Sn, and Au.

6. A capacitor comprising:

an insulating substrate having a first main surface and a second main surface opposed to the first main surface, the insulating substrate containing an inorganic oxide as a main material thereof;

a capacitance forming portion on the first main surface, the capacitance forming portion including a conductive metal porous body, a dielectric film covering a surface of the metal porous body, and a conductive film covering the dielectric film;

a sealing portion on the first main surface and positioned so as to seal the capacitance forming portion together with the insulating substrate;

a first external connection line connected to the conductive metal porous body of the capacitance forming portion, the first external connection line including a first via conductor penetrating the insulating substrate so as to reach the second main surface from the first main surface; and a second external connection line connected to the conductive film of the capacitance forming portion, the second external connection line including a second via conductor penetrating the insulating substrate so as to reach the second main surface from the first main surface, wherein the first via conductor and the second via conductor are both located in a region where the capacitance forming portion is disposed when viewed in a normal direction of the first main surface, and wherein a part of the metal porous body enters the second via conductor in a portion penetrating the insulating substrate.

* * * * *